(12) United States Patent
Shinada et al.

(10) Patent No.: US 7,448,353 B2
(45) Date of Patent: Nov. 11, 2008

(54) INTAKE DEVICE OF INTERNAL COMBUSTION ENGINE

(75) Inventors: Masashi Shinada, Saitama (JP); Yuta Saito, Tokyo (JP)

(73) Assignee: MAHLE Filter Systems Japan Corporation, Tokyo (JP)

( * ) Notice: Subject to any disclaimer, the term of this patent is extended or adjusted under 35 U.S.C. 154(b) by 102 days.

(21) Appl. No.: 10/578,317

(22) PCT Filed: Oct. 28, 2004

(86) PCT No.: PCT/JP2004/015991

§ 371 (c)(1),
(2), (4) Date: May 4, 2006

(87) PCT Pub. No.: WO2005/045225

PCT Pub. Date: May 19, 2005

(65) Prior Publication Data

US 2007/0131189 A1    Jun. 14, 2007

(30) Foreign Application Priority Data

Nov. 6, 2003  (JP) .......................... 2003-376362
Sep. 17, 2004  (JP) .......................... 2004-270725

(51) Int. Cl.
    *F02M 35/10* (2006.01)
(52) U.S. Cl. .............. 123/184.57; 123/184.53
(58) Field of Classification Search ............ 123/184.53, 123/184.57; 181/204, 229
    See application file for complete search history.

(56) References Cited

U.S. PATENT DOCUMENTS

| 5,333,576 A | * | 8/1994 | Verkleeren | ............. | 123/184.57 |
| 6,600,408 B1 | * | 7/2003 | Walter et al. | ........... | 123/184.57 |
| 6,848,410 B2 | * | 2/2005 | Hoffmann et al. | ...... | 123/184.57 |
| 2003/0066288 A1 | | 4/2003 | Shiga | | |

FOREIGN PATENT DOCUMENTS

| JP | 57-92061 U | 6/1982 |
| JP | 2-115511 A | 4/1990 |
| JP | 3-222854 A | 10/1991 |
| JP | 10-339225 A | 12/1998 |
| JP | 11-082202 A | 3/1999 |
| JP | 2000-303925 A | 10/2000 |
| JP | 2001-012324 A | 1/2001 |
| JP | 2001-200771 A | 7/2001 |
| JP | 2003-113748 A | 4/2003 |

* cited by examiner

*Primary Examiner*—Noah Kamen
(74) *Attorney, Agent, or Firm*—Foley & Lardner LLP

(57) ABSTRACT

A resonator 13 is provided including a resonating body 13 which is vibrated by intake air pulsation in an intake system 5, a volume chamber 14 connected through the resonating body 13 to the intake system 5, and a neck section 16 through which an interior space 15 of the volume chamber 14 is communicated with outside. The interior space 15 of the volume chamber 14 and interior of the intake system 5 are partitioned by the resonating body 13. The resonator is so set that a sound pressure in a certain frequency range is released from the neck section 16 to the outside under vibration of the resonating body 13. With this, the sound pressure characteristics of air intake sound can follow a rise in engine speed.

9 Claims, 21 Drawing Sheets

US 7,448,353 B2

INTAKE DEVICE OF INTERNAL COMBUSTION ENGINE

TECHNICAL FIELD

This invention relates to an intake device of an internal combustion engine.

BACKGROUND ART

It is well known as a conventional technique, in an intake system of an internal combustion engine, to reduce intake air pulsation caused by reciprocating movement of a piston and an intake valve by regulating the diameter and length of an intake passage such as an intake duct or the like, the volume of an air cleaner constituting a part of the intake system and by adding a resonator to the intake system.

However, in such a known technique, tuning air intake sound within a preset certain target sound pressure characteristics range is the main object. Accordingly, the sound pressure characteristics of this tuned air intake sound does not necessarily change linearly with an increase in engine speed, so that there is a fear of providing uncomfortable feeling to a driver.

A patent literature 1 discloses obtaining air intake sound having powerful feeling within a passenger compartment during acceleration by connecting a plurality of intake air ducts having resonance frequencies different from each other to a dusty side of an air cleaner and by generating air intake sound in these intake air ducts during an engine high load operation.

The patent literature 1: Japanese Patent Provisional Publication No. 2000-303925.

In this patent literature 1, a characteristics in which the frequency and sound pressure level increases generally linearly with an increase in engine speed can be obtained within the passenger compartment during acceleration by using air intake sounds generated from the intake air ducts during the engine high load operation. However, in the arrangement of the patent literature 1, it is necessary to tune the length of the intake air duct, the passage cross-sectional areas inside the intake air ducts and the like in order to generate desired air intake sound during the engine high load operation, and therefore there is a fear that a layout of the intake system is largely restricted.

Additionally, the following technique has been hitherto known: In the intake air passage through which necessary air is taken into the internal combustion engine, a part of air intake sound leaks to an outside section (or the outside of the intake air passage) through a part of a peripheral wall of the intake air passage, thereby lowering the sound pressure at a specified frequency so as to achieve silence. For example, a patent literature 2 discloses an intake air duct which is arranged such that an opening portion is formed at a part of the peripheral wall of the intake air duct through which outside air is introduced into an air cleaner, and a porous material having an air permeability is joined to cover this opening portion.

The patent literature 2: Japanese Patent Provisional Publication No. 2001-12324.

However, in this patent literature 2, there is such a problem that the sound pressure level become rather too low at a part of frequency ranges because of being arranged from such a viewpoint that the sound pressure level is sufficient to meet a certain target level only on the basis of taking preference of silence of the intake system, so that the tone feeling of air intake sound felt by the driver within the passenger compartment becomes unsatisfactory to the driver.

In view of the above, an object of the present invention is to provide an intake device of an internal combustion engine, for preventing the tone feeling of air intake sound from degrading.

DISCLOSURE OF INVENTION

An intake device of an internal combustion engine as claimed in claim 1 comprises a resonator including a resonating body which is vibrated by intake air pulsation in an intake system, a volume chamber connected through the resonating body to the intake system, and a volume chamber opening section through which an interior space of the volume chamber is communicated with outside, wherein the interior space of the volume chamber and interior of the intake system are partitioned by the resonating body, wherein the resonator is so set that a sound pressure in a certain frequency range is released from the volume chamber opening section to the outside under vibration of the resonating body. With this, the sound pressure characteristics of air intake sound becomes one obtained by adding the sound pressure released from the resonator, so that the sound pressure characteristics of air intake sound can be tuned into a desired characteristics by using the resonator.

The invention as claimed in claim 2 is, in the intake device of an internal combustion engine as claimed in claim 1, that a setting is made such that sound pressure of air intake sound increases with an increase in engine speed by adding sound pressure released from the resonator to the air intake sound. With this, the magnitude of air intake sound can be increased following an accelerator opening degree, thereby preventing uncomfortable feeling from being given to a driver.

The invention as claimed in claim 3 is, in the intake device of an internal combustion engine as claimed in claim 2, that the volume chamber opening section is close to at least one of a dash panel or either one of right and left side panel of panels defining an engine compartment. In a sound pressure mode within the engine compartment, an antinode of the sound pressure mode is formed near the dash panel and right and left side panels. With this, the sound pressure released from the resonator can be effectively propagated into the passenger compartment, thereby making possible compactification of the resonator.

The invention of claim 4 is, in the intake device of an internal combustion engine as claimed in claim 3, that the intake device comprises a plurality of the resonators which are set to release respectively sound pressures in frequency ranges similar to each other through the respective volume chamber opening sections to the outside, the plurality of resonators being installed to the intake system in such a manner that the sound pressures to be released from the respective resonators are released to the outside with a certain time difference between the sound pressures. With this, so-called rumbling noise is generated by the fact that the sound pressures are released from the respective plural resonators with the fine difference, thereby making it possible to increase a powerful feeling and a dynamic feeling.

The invention claimed in claim 5 is, in the intake device of an internal combustion engine, as claimed in claim 4, that the resonating body is set such that the sound pressure in a frequency range of (engine speed/60)×(natural number/2) is released from the volume chamber opening section in a certain engine speed range of the engine.

An intake device of an internal combustion engine as claimed in claim 6 comprises an intake air passage through which intake air is introduced into the internal combustion engine, and a resonance passage branched off from the intake air passage, wherein the resonance passage has one end opened to atmospheric air and the other end connected to the intake air passage, the resonance passage having a passage length set to add a sound pressure in a certain frequency range to air intake sound. With this, a part of air intake sound is introduced from the intake air passage to the resonance passage. In other word, a part of air intake sound is allowed to leak from the intake air passage to the resonance passage thereby lowering the sound pressure of air intake sound. Additionally, air intake sound introduced into the resonance passage is resonated within the resonance passage, thereby making it possible to release the sound pressure having a frequency component required for improving the tone of air intake sound, from one end of the resonance passage.

The invention of claim 7 is, in the intake device as claimed in claim 6, that a sound-transmissible material having a gas permeability is disposed in the resonance passage. With this, a part of air intake sound is introduced from the intake air passage through the sound-transmissible material, thereby further effectively lowering the sound pressure of air intake sound.

The invention of claim 8 is, in the intake device of an internal combustion engine as claimed in claim 6, that an air cleaner is disposed in the intake air passage, the resonance passage being communicated with the intake air passage at an upstream side of the air cleaner, wherein a change-over valve is disposed in the intake air passage at a connecting section to which the resonance passage is connected, the change-over valve being adapted to close either one of the resonance passage and an upstream side section of the intake air passage relative to the connecting section and open the other in accordance with an engine operating condition, wherein the change-over valve whose at least a part is formed of a sound-transmissible material having a gas permeability. With this, according to the engine operating condition, an air intake sound reduction and a local resonance in an intake air introduction path at the upstream side of the air cleaner can be achieved during a low engine speed operation of the engine, and a sufficient air flow amount to the engine through a first outside air duct can be secured while a sound pressure having a frequency component effective for improving the tone of air intake sound is released from a second outside air duct during medium and high engine speed operation of the engine.

THE BEST MODE FOR CARRYING OUT THE INVENTION

Hereinafter, an embodiment of the present invention will be discussed with reference to drawings.

Figure 1:
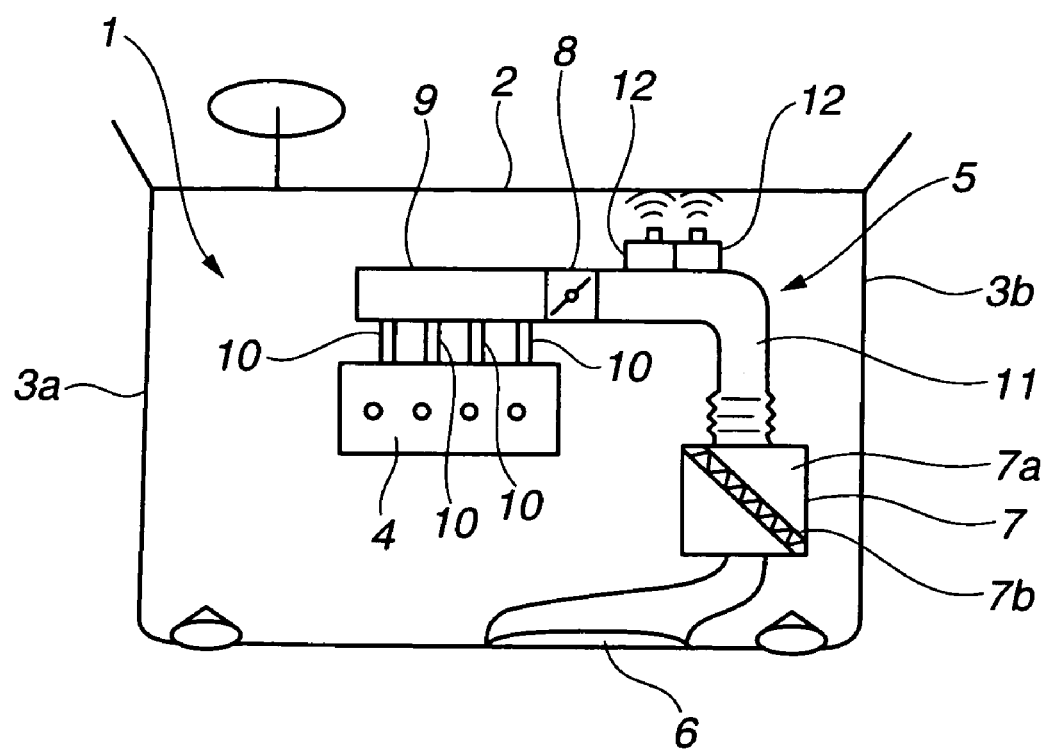
FIG. 1 is an explanatory view schematically showing an outline arrangement of an intake device of an internal combustion engine, according to a first embodiment of the present invention.

FIG. 1 is an explanatory view for schematically showing a state where an engine compartment 1 located at a front body of a vehicle is viewed from the upper side of the vehicle. An in-line 4-cylinder engine 4 is disposed within the engine compartment 1 defined by a dash panel 2, left and right side panels 3a, 3b and the like. An intake system 5 through which air is introduced is connected to the engine 4. The intake system 5 is disposed in such a manner that an intake air taking-in opening 6 is opened at the front surface of the vehicle, so that air sucked from the intake air taking-in opening 6 is introduced through an air cleaner 7 and a throttle valve 8 to an intake air collector 9 and thereafter is supplied to combustion chambers (not shown) of respective engine cylinders through respective branch pipes 10. Additionally, a clean side duct 11 through which a clean side 7a of the air cleaner 7 is connected to the throttle valve 8 is provided with two resonators 12a, 12b which are disposed adjacent to each other and arranged to release sound pressures in certain frequency ranges under the action of intake air pulsation generated within the intake system 5 under reciprocating movement of pistons (not shown) and intake valves (not shown). The reference numeral 7b in FIG. 1 designates a filter element.

Figure 2:
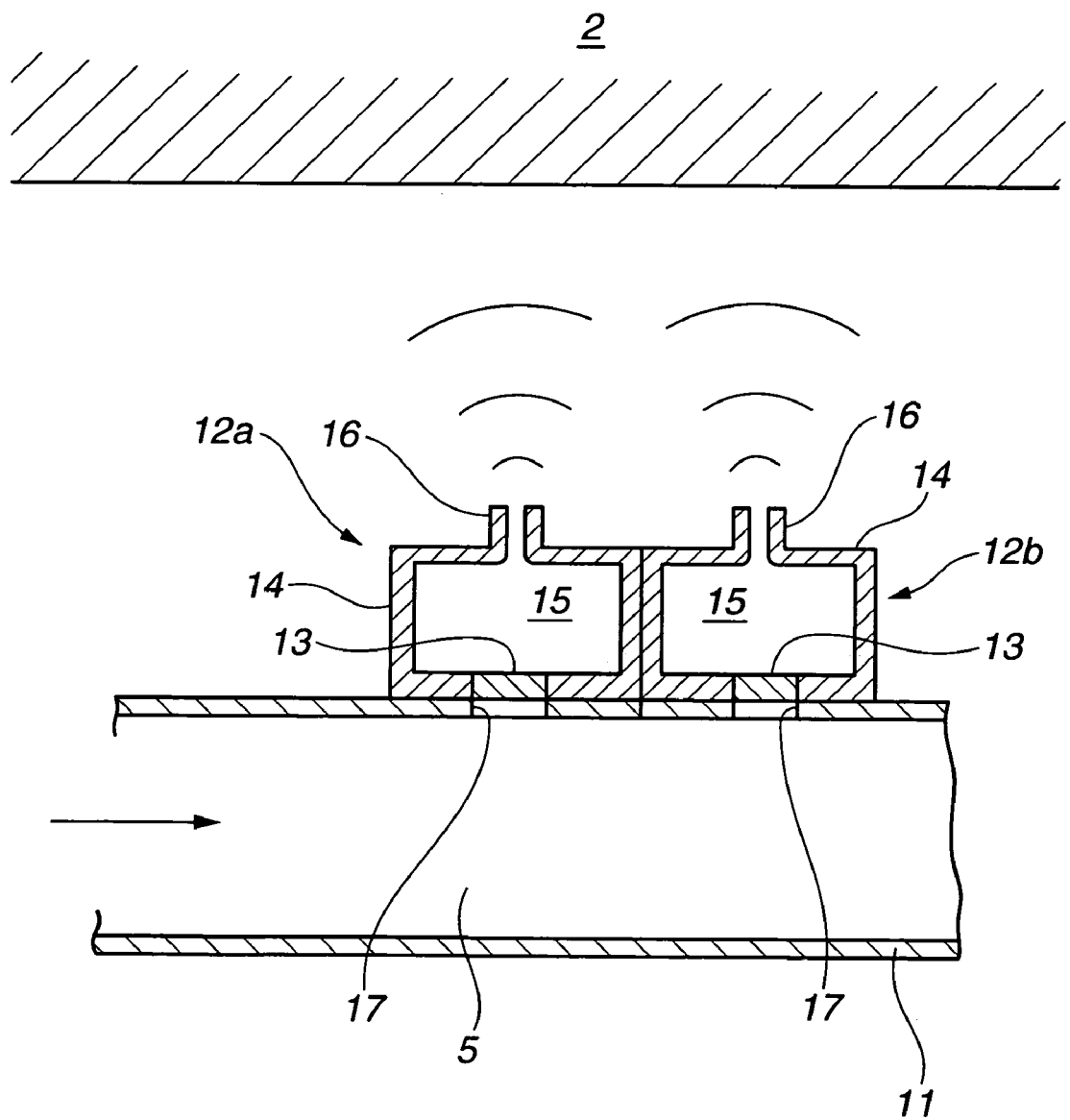
FIG. 2 is an explanatory view of an essential part of the intake device of an internal combustion engine, according to the first embodiment.

As shown in FIG. 2, the resonator 12 includes a box as its main body which box is formed of plastic or the like and installed to the outer wall of the clean side duct 11. The resonator 12 is generally constituted of a resonating body 13 which is vibrated by intake air pulsation within the intake system 5, a volume chamber 14 communicated through the resonating body 13 with the clean side duct 11 of the air intake system 5, and a neck section 16 serving as volume chamber opening section through which inside space 15 of the volume chamber 14 is communicated with outside. The resonating body 13 blocks a through-hole 17 formed at a resonator installation position of the clean side duct 11 and partitions the inside space 15 of the volume chamber 14 from the inside of the air intake system 5 so as to vibrate in accordance with intake air pulsation inside the intake air passage or the clean side duct 11.

Structure of the resonator 12 will be discussed. In this first embodiment, a structure in which the neck section 16 is narrowed as compared with the volume chamber 14 so as to obtain a so-called cavity resonance (Helmholtz resonance) in accordance with vibrations of the resonating body 13. The neck section 16 of the resonator 12 is located near the dash panel 2 defining the engine compartment 1 and disposed such that its opening faces the dash panel 2.

In this first embodiment, the sound pressure released from each resonator 12a, 12b is set within a certain frequency range in order to obtain such a sound pressure characteristics of air intake sound that the sound pressure changes generally linearly with an increase in engine speed by adding the sound pressure released from each resonator 12a, 12b to the air intake sound generated from the air intake system 5. In other words, each resonator 12a, 12b is set so as to obtain such a sound pressure characteristics of air intake sound that the sound pressure changes generally linearly with an increase in engine speed, by adding the sound pressure from each resonator 12a, 12b to air intake sound whose sound pressure changes in relation to an accelerator opening degree at a certain engine speed range. Further in other words, a setting is made to add the sound pressure released from each resonator to a notch region in sound pressure characteristics of air intake sound which changes with an increase in engine speed, i.e., a range where the sound pressure of air intake sound decreases with an increase in engine speed.

In concrete, these resonators are set to release through respective neck sections 16, 16 the sound pressures within frequency ranges defined by [(engine speed/60)×(number of cylinders of engine)], at a certain engine speed range. More specifically, in case that no resonator 12a and resonator 12b are provided, as indicated by a curve B in FIG. 3, the sound pressure is low at medium and high ranges in an objective engine speed range. However, as indicated by a curve A in FIG. 3, if the sound pressures released from the resonator 12a and the resonator 12b is added to the air intake sound generated in the intake system 5, the sound pressure also increases with an increase in engine speed as a whole, so that setting is made to obtain such a sound pressure characteristics of air intake sound that the sound pressure changes generally linearly with an increase in engine speed. In other words, the respective resonators 12a, 12b are set such that the sound pressure characteristics generally follows a target line which rises in a rightward direction in FIG. 3.

Figure 3:
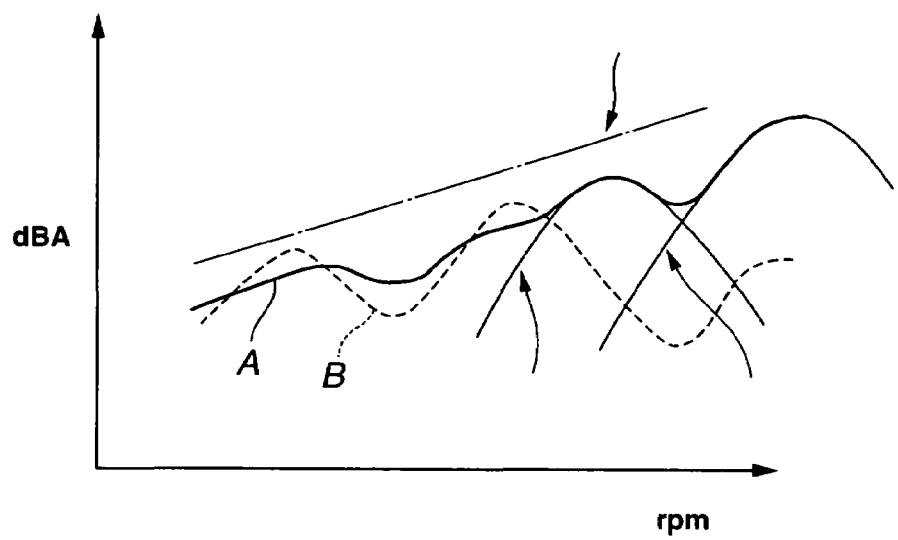
FIG. 3 is an explanatory view showing a sound pressure characteristics of air intake sound.

Consequently, in this first embodiment, each resonator 12a, 12b is set to release the sound pressure within the frequency range obtained by multiplying (engine speed/60) serving as a basic revolution frequency by the number of cylinders of the engine 4. As a result, such a sound pressure characteristics of air intake sound that the sound pressure changes generally linearly with an increase in engine speed can be obtained for the air intake sound at frequencies obtained by multiplying the basic revolution frequency by the number of cylinders of the engine 4, so that the driver can physically feel an acceleration sound which generally linearly changes with an increase in acceleration. In FIG. 3, the curve A indicated by a solid line represents a sound pressure characteristics of the air intake sound in this embodiment including the resonators 12 provided in the intake system 5; and the curve B indicated by a dotted line represents a sound pressure characteristics of the air intake sound in a case where no resonators 12 are provided.

Figure 4:
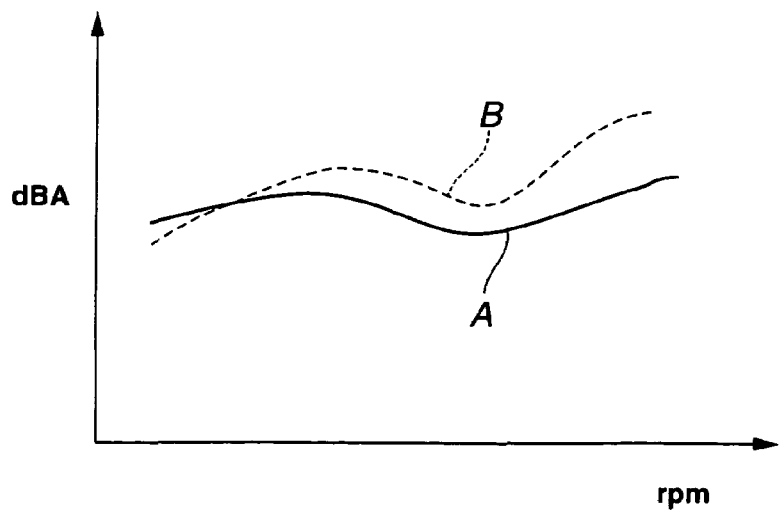
FIG. 4 is an explanatory view showing a sound pressure characteristics of air intake sound.

In the above-mentioned condition, i.e., a condition in which the sound pressure released from each resonator 12a, 12b is set within the frequency range obtained by multiplying the basic revolution frequency by the number of cylinders of the engine, the air intake sound at the frequency obtained by multiplying the basic revolution frequency by (the number of the cylinders of the engine/2) can be suppressed in sound pressure level of the air intake sound as a whole as indicated by a curve A in FIG. 4, as compared with a case (indicated by a curve B in FIG. 4) where no resonator is provided, thereby achieving suppression of noise outside the vehicle. This is caused by the fact that a part of energy (sound pressure) of intake air pulsation is consumed upon vibration of the resonating bodies 13.

Figure 5:
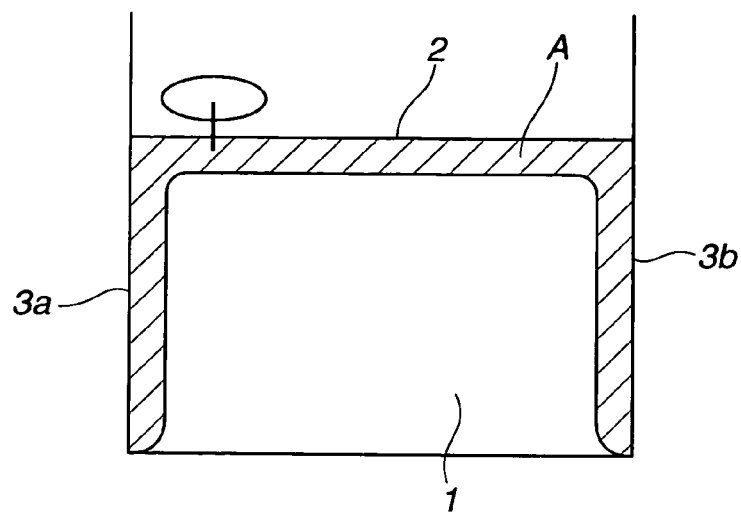
FIG. 5 is an explanatory view schematically showing a position at which an antinode of a sound pressure mode of air intake sound is formed, in an engine compartment.

The neck section 16, 16 of each resonator 12a, 12b is located near the dash panel 2, and disposed such that its opening faces the dash panel 2. With this, the sound pressure level of the sound pressure released from the resonator 12 can be relatively lowered thereby making it possible to make the resonator 12 small-sized. This is because the sound pressure mode of the air intake sound within the engine compartment tends to form antinode of sound pressure mode (antinode of standing wave) near the dash panel 2 and the left and right side panels 3a, 3b, thereby relatively lowering the sound pressure released from the resonator 12. In other words, as shown in FIG. 5, by disposing the neck section of the resonator within a region A near the dash panel 2 and the left and right side panels 3a, 3b within the engine compartment 1 and by arranging the opening of the neck section 16 to face the dash panel 2 or any of the left and right side panels 3a, 3b, the sound pressure released from the resonators 12 is decreased while the sound pressure can be effectively added to the air intake sound.

Figure 6:
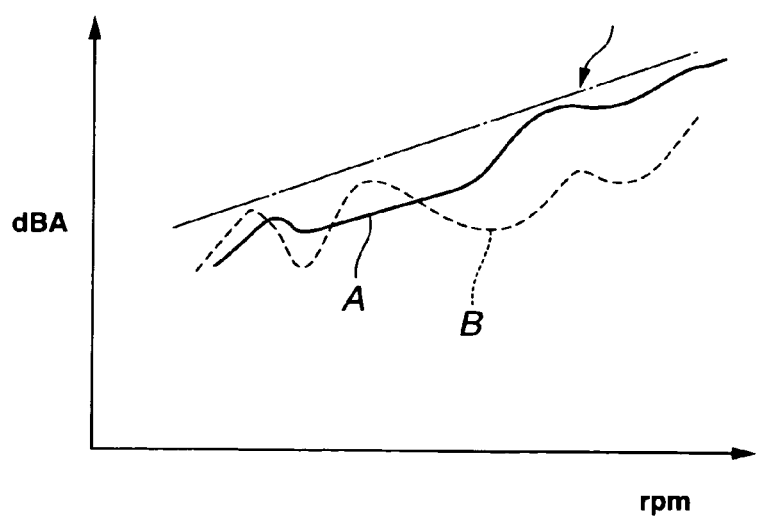
FIG. 6 is an explanatory view showing a sound pressure characteristics of air intake sound.
Figure 7:
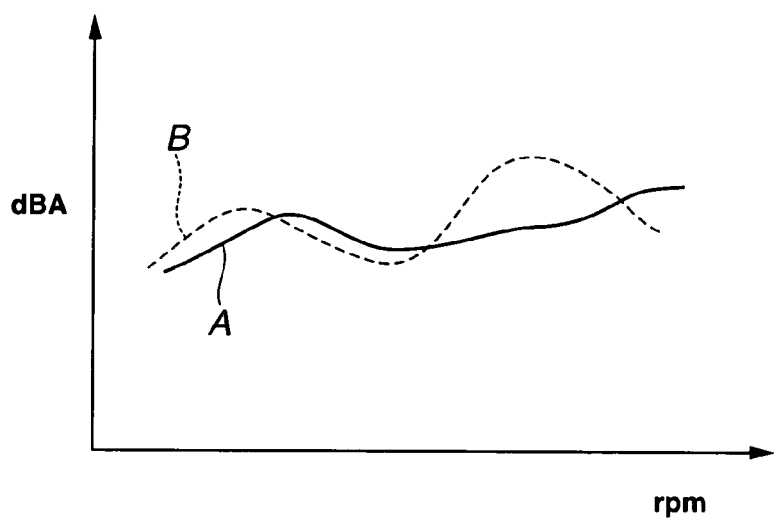
FIG. 7 is an explanatory view showing a sound pressure characteristics of air intake sound.

FIGS. 6 and 7 are explanatory views showing sound pressure characteristics of air intake sound in a case that the above-mentioned resonator 12 of the first embodiment is applied to a V-type 6-cylinder engine. Each resonator 12a, 12b is set to release from the neck section sound pressure within a frequency range defined by (engine speed/60)× (number of cylinders of engine), at a certain engine speed range; and such a sound pressure characteristics of air intake sound that the sound pressure changes generally linearly with an increase in engine speed can be obtained when the released sound pressure is added to air intake sound generated in the intake system 5 (See FIG. 6).

As a result, the driver can physically feel an acceleration sound which generally linearly changes with an increase in acceleration, during acceleration. Additionally, also in this case, i.e., in a condition in which the sound pressure released from the resonator 12 is set within the frequency range obtained by multiplying the basic revolution frequency by the number of cylinders of the engine, the air intake sound at the frequency obtained by multiplying the basic revolution frequency by (the number of the cylinders of the engine/2) can be suppressed in sound pressure level of the air intake sound as a whole as indicated by a curve A in FIG. 7, as compared with a case (indicated by a curve B in FIG. 7) where no resonator 12 is provided, thereby achieving suppression of noise outside the vehicle. This is caused by the fact that a part of energy (sound pressure) of intake air pulsation is consumed upon vibration of the resonating bodies 13.

Figure 8:
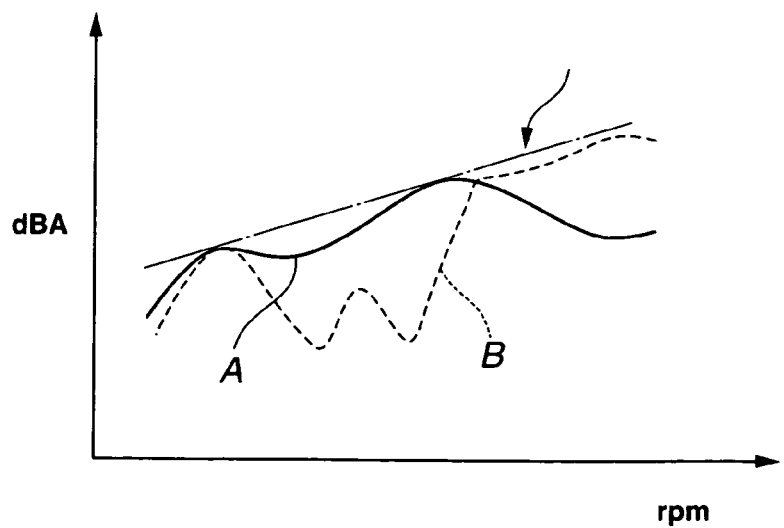
FIG. 8 is an explanatory view showing a sound pressure characteristics of air intake sound.
Figure 9:
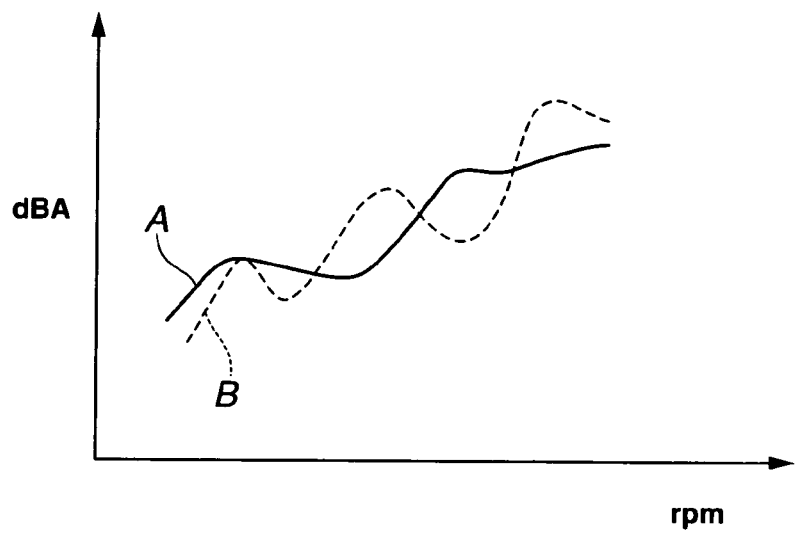
FIG. 9 is an explanatory view showing a sound pressure characteristics of air intake sound.

FIGS. 8 and 9 are explanatory views showing sound pressure characteristics of air intake sound in a case that the above-mentioned resonator 12 of the first embodiment is applied to a V-type 8-cylinder engine. Each resonator 12a, 12b is set to release from the neck section 16 sound pressure within a frequency range defined by (engine speed/60)× (number of cylinders of engine/2), at a certain engine speed range; and such a sound pressure characteristics of air intake sound that the sound pressure changes generally linearly with an increase in engine speed can be obtained when the released sound pressure is added to air intake sound generated in the intake system 5 (See FIG. 8).

As a result, the driver can physically feel an acceleration sound which generally linearly changes with an increase in acceleration, during acceleration. Additionally, in a condition in which the sound pressure released from the resonator 12 is set within the frequency range obtained by multiplying the basic revolution frequency by (the number of cylinders of the engine/2), the air intake sound at the frequency obtained by multiplying the basic revolution frequency by the number of the cylinders of the engine can be suppressed in sound pressure level of the air intake sound as a whole as indicated by a curve A in FIG. 9, as compared with a case (indicated by a curve b in FIG. 9) where no resonator 12 is provided, thereby achieving suppression of noise outside the vehicle. This is caused by the fact that a part of energy (sound pressure) of intake air pulsation is consumed upon vibration of the resonating bodies 13.

Additionally, the resonators 12 of the above-mentioned first embodiment can be arranged as shown in FIGS. 10 to 13.

Figure 10:
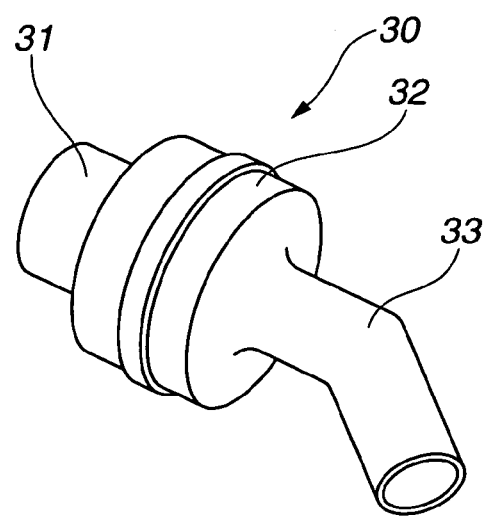
FIG. 10 is an explanatory view showing another embodiment of the resonator.
Figure 11:
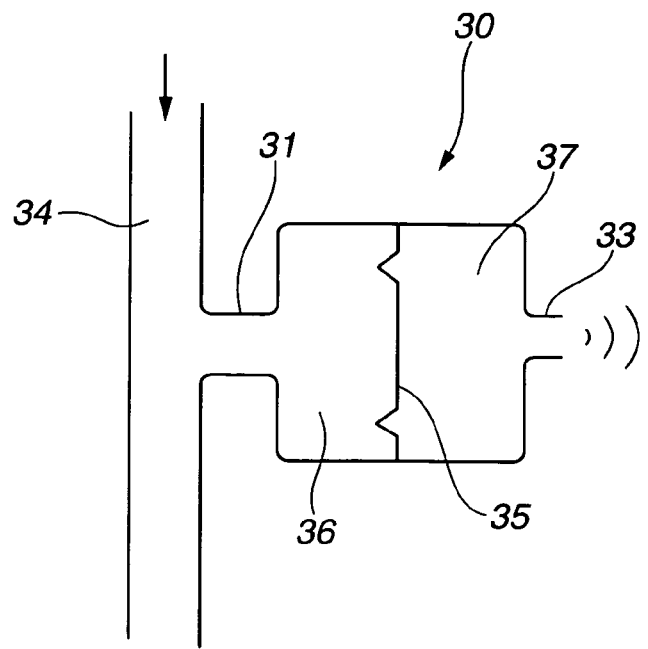
FIG. 11 is an explanatory view showing the another embodiment of the resonator.

The resonator 30 shown in FIGS. 10 and 11 is generally constituted of a cylindrical base section 31 connected to an intake system 34, a cylindrical main body section 32 larger in diameter than the base section 31, and a neck section 33 serving as a volume chamber opening section through which the inside space of the main body section 32 is communicated with outside. The inside space of the main body section 32 is divided by a resonating body 35 made of rubber to define an air intake system side volume chamber 36 communicated with the intake system 34 and a volume chamber 37 opened to the outside through the neck section 33. The neck section 33 has a structure narrowed as compared with the volume chamber 37.

Figure 12:
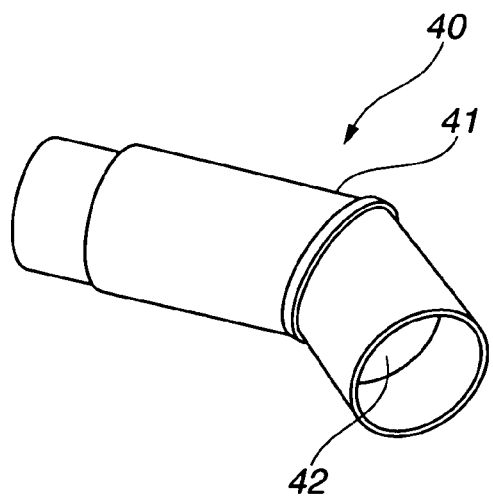
FIG. 12 is an explanatory view showing a further embodiment of the resonator.
Figure 13:
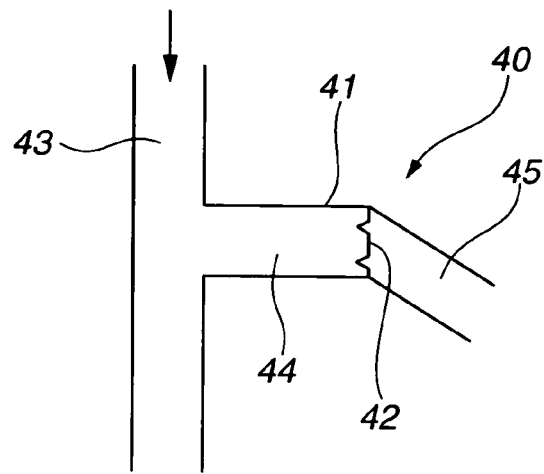
FIG. 13 is an explanatory view showing the further embodiment of the resonator.

Additionally, a resonator 40 shown in FIGS. 12 and 13 is generally constituted of a cylindrical main body section 41, and a resonating body 42 made of rubber and disposed inside the main body section 41. The main body section has an end connected to an intake system 43 and the other end opened to outside. The inside of the main body section 41 is divided by a resonating body 42 to define an intake system communication space 44 communicated with an air intake system 43 and an outside communication space 45 serving as a volume chamber which is not communicated with the air intake system 43 and is communicated with outside. The resonator 40 releases sound pressure within a certain frequency range from it's the other end of the main body section 41, upon vibration of the resonating body 42 in accordance with intake air pulsation generated inside the air intake system 43, i.e., upon so-called columnar resonance. In this resonator 40, the other end of the main body section 41 corresponds to the volume chamber opening section. Additionally, in this resonator 40, the frequency range of sound pressure released to outside and the magnitude of the sound pressure can be tuned by suitably setting the axial length of the main body section 41, the inner diameter of the main body section 41 and the like.

Next, a second embodiment of the present invention will be discussed. In this second embodiment, as shown in FIG. 14, a structure is such that a resonator 50 for generating sound pressure in accordance with intake air pulsation of an air intake system is incorporated with an air cleaner 51 as a single body.

The air cleaner 51 is constituted of an air cleaner upper section 51a to which an intake air duct 52 is connected, and an air cleaner lower section 51b incorporated with an intake manifold 53 as a single body. A filter element (not shown) is disposed at a position at which the air cleaner upper section 51a is incorporated with the air cleaner lower section 51b, in which a clean side is mainly formed at an intake air downstream side relative to the air cleaner lower section 51b.

The air cleaner lower section 51b is formed integrally with a volume chamber base section 54 whose inside forms part the volume chamber of the resonator 50. Additionally, a neck section 55 projects outward and serves as the volume chamber opening section communicated with the inside of the volume chamber base section 54. The inside of the volume chamber base section 54 is divided by a partition wall 56 to define two volume chambers. The neck sections 55, 55 are respectively formed to communicate with the corresponding volume chambers. Thus, a structure is such that two volume chambers are defined inside the air cleaner lower section 51b by assembling a volume chamber lid section separate from the volume chamber base section 54 to the volume chamber base section 54. Two holes 58, 58 corresponding to the respective volume chambers are piercingly formed in the volume chamber lid section 57. Generally disc-shaped resonating bodies 59, 59 made of rubber are respectively installed through ring members 60, 60 to the holes 58, 58. Additionally, a structure is such that the neck sections 55, 55 are narrowed relative to the volume chambers.

Figure 14:
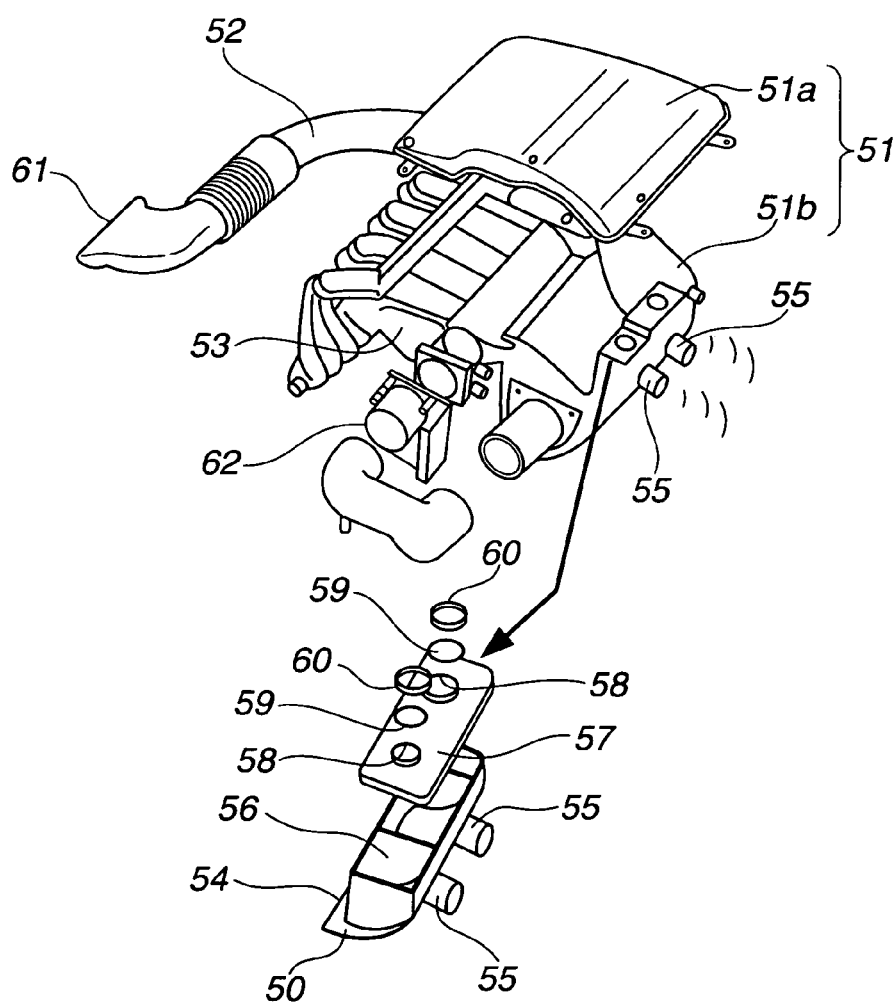
FIG. 14 is an explanatory view schematically showing an outline arrangement of the intake device of an internal combustion engine, according to a second embodiment of the present invention.

In FIG. 14, the reference numeral 61 designates an intake air taking-in opening located on the upstream side of the air cleaner 51; and the reference numeral 62 designates a throttle valve located at a downstream side of the air cleaner 51 and installed to the intake manifold 53.

Also in this second embodiment, the resonating body 59 can be vibrated by intake air pulsation generated within the air intake system, and therefore operational effects similar to those in the above-mentioned first embodiment can be obtained. In other words, the frequency range of sound pressure released from the resonator 50 is tuned in accordance with the number of cylinders of the engine, in which the frequency range is turned at the basic revolution frequency×(the number of cylinders of the engine) in case that the engine has four cylinders or six cylinders, and the frequency range is tuned at the basic revolution frequency×(the number of cylinders of the engine/2) in case that the engine has eight cylinders. By this, the driver can physically feel acceleration sound which generally linearly changes with an increase in acceleration during acceleration. Additionally, the resonator 50 is formed integral with the air cleaner, and therefore lowering in production cost can be achieved.

In such resonators using the cavity resonance as ones shown in FIGS. 2, 10 and 14, regarding the frequency range of sound pressure released from the resonator, sound pressure within a desired frequency range can be released to outside by suitably setting the volume of the neck section, the volume of the volume chamber and the mass of the resonating body.

Figure 15:
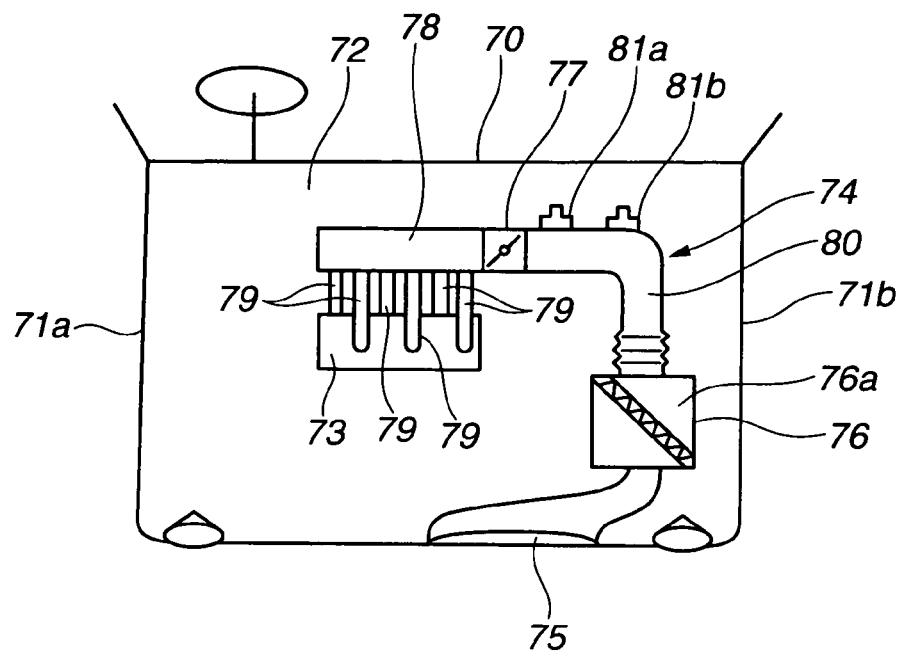
FIG. 15 is an explanatory view schematically showing an outline arrangement of the intake device of an internal combustion engine, according to a third embodiment of the present invention.

Next, a third embodiment of the present invention will be discussed. As shown in FIG. 15, a V-type six-cylinder engine 73 is disposed within an engine compartment 72 defined by a dash panel 70 and left and right side panels 71a, 71b, and the like. An intake system 74 through which intake air is introduced is connected to the engine 73. The intake system 74 is disposed in such a manner that an intake air taking-in opening 75 is opened to the front surface of a vehicle. Air taken in through the intake air taking-in opening 75 is introduced through an air cleaner 76 and a throttle valve 77 into an intake air collector 78, and thereafter is supplied to the combustion chambers of respective cylinders through respective branch pipes 79 from the intake air collector 78. A clean side duct 80 for connecting the clean side 76a of the air cleaner 76 and the throttle valve 77 is provided with two resonators 81a, 81b which respectively release certain sound pressures which are similar to each other under the action of intake air pulsation generated within the intake system 74 and generated by reciprocating movements of a piston (not shown) and an intake valve (not shown). These two resonators 81a, 81b are disposed along an intake air flowing direction in the clean side duct 80 and at certain intervals so as to space from each other.

Each resonator 81a, 81b is the same in arrangement as the resonator (See FIG. 2) in the above-mentioned first embodiment and is generally constituted of the resonating body 13, the volume chamber 14 communicated through the resonating body 13 with the clean side duct 80 of the air intake system 74, and the neck section 16 serving as the volume chamber opening section through which the inside space 15 of the volume chamber 14 is communicated with outside. The resonating body 13 blocks the through-hole 17 formed at the resonator installation position of the clean side duct 80 and partitions the inside space 15 of the volume chamber 14 from the inside of the intake system 74 so as to be vibrated in accordance with intake air pulsation.

Figure 16:
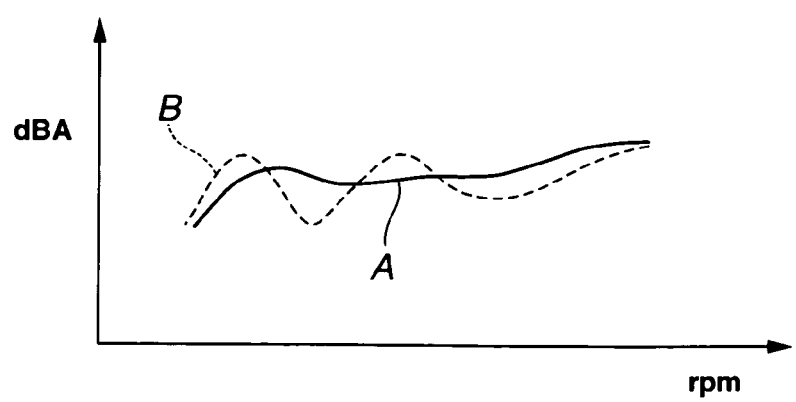
FIG. 16 is an explanatory view showing a sound pressure characteristics of air intake sound.

In this third embodiment, the sound pressure released from each resonator 81a, 81b is set such that, as shown in FIG. 16, the sound pressure within the frequency range defined by (engine speed/60)×(the number of cylinders of the engine) is released from the neck section 16; and additionally, the released sound pressure is added to the air intake sound generated from the air intake system 74 thereby obtaining a sound pressure characteristics of air intake sound in which sound pressure generally linearly changes with an increase in engine speed.

Here, in the third embodiment, the respective resonators 81a, 81b are disposed spaced a certain distance from each other along the intake air flowing direction in the clean side duct 80, and therefore an arrangement is formed such that a time difference is positively made between a timing at which sound pressure is released from the resonator 81a and a timing at which sound pressure is released from the resonator 81b.

Figure 17:
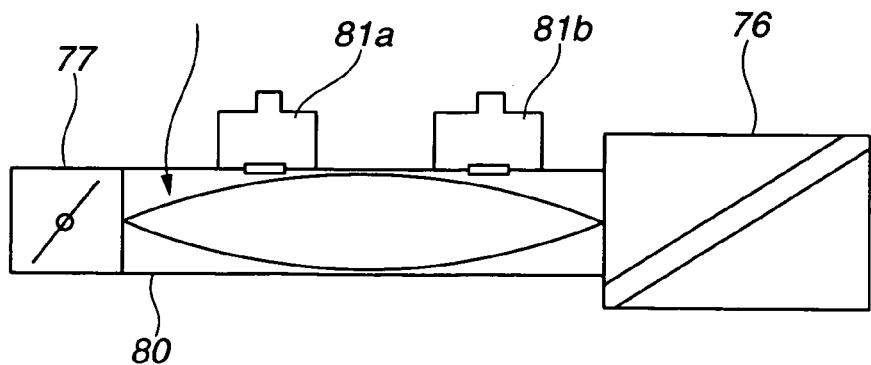
FIG. 17 is an explanatory view schematically showing the relationship between the sound pressure mode within a clean side duct in FIG. 15 and the resonator.

Explanation will be made using FIG. 17. Regarding the sound pressure mode of intake air pulsation inside the clean side duct 80, the connecting position of the clean side duct with the throttle valve 77 and the connecting position of the clean side duct with the air cleaner 76 are regarded as open ends, so that the nodes of the sound pressure mode is formed at the connecting positions. The resonators 81a, 81b are respectively disposed spaced a certain distance from each other along the intake air flowing direction in the clean side duct 80. Therefore, in case that attention is paid on a certain intake air pulsation, a time difference is produced between a time at which the intake air pulsation reaches the resonator 81a and a time at which the intake air pulsation reaches the resonator 81b, so that a time difference is produced between the timing at which the resonator 81a releases the sound pressure and the timing at which the resonator 81b releases the sound pressure. Additionally, the magnitude of the sound pressure mode at the position of the resonator 81a is different from the magnitude of the sound pressure mode at the position of the resonator 81b, and therefore the magnitude of the sound pressure released from the resonator 81a is different from the magnitude of the sound pressure released from the resonator 81b.

Figure 18:
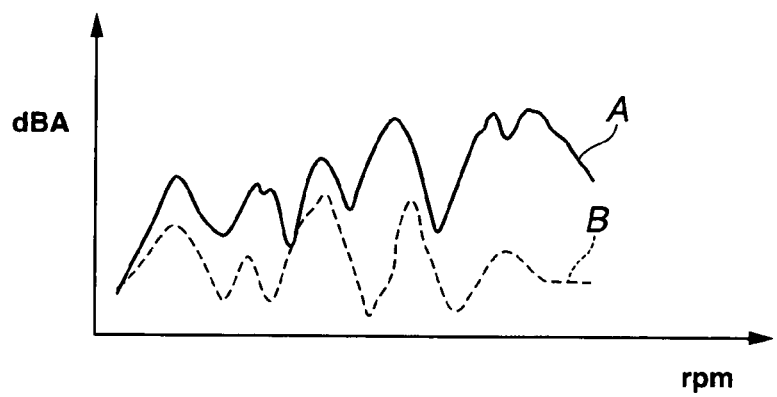
FIG. 18 is an explanatory view showing a sound pressure characteristics of air intake sound.
Figure 19:
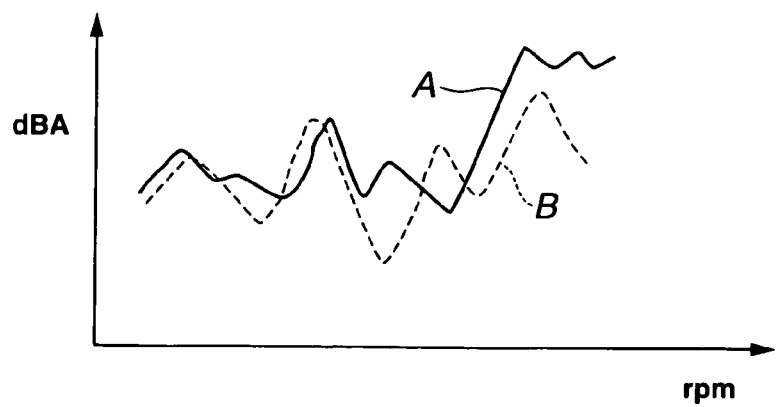
FIG. 19 is an explanatory view showing a sound pressure characteristics of air intake sound.

As a result, in this third embodiment, the sound pressures different in magnitude from each other are respectively released with a time difference from the resonators 81a, 81b, so that a so-called rumbling noise can be generated thereby making it possible to set the tone of air intake sound according to the driver's likes. Here, in concrete, the rumbling noise is one that emphasizes the air intake sound at the frequency of (number of cylinders of engine/2)×{((2×natural number)−1)/2}. In this third embodiment, as shown in FIGS. 18 and 19, the air intake sound (FIG. 18) at the frequency of basic revolution frequency×(number of engine cylinders/4) and the air intake sound (FIG. 19) at the frequency of basic revolution frequency×(number of engine cylinders×3/4) are emphasized (enlarged) in sound pressure level as compared with a case where no resonator 81 is provided.

Figure 20:
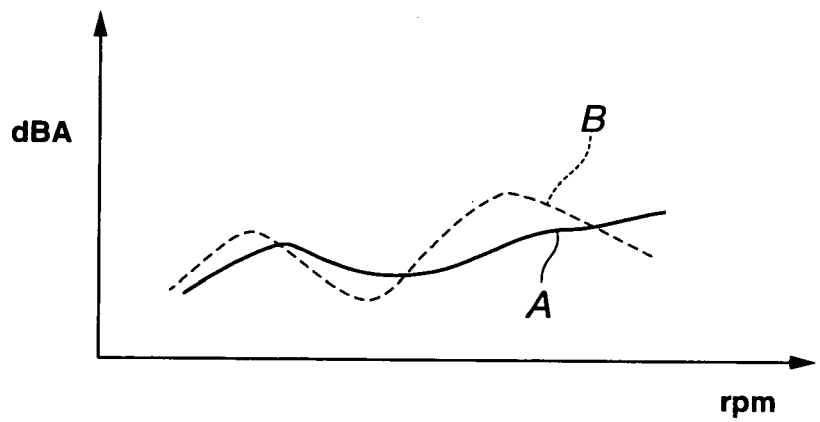
FIG. 20 is an explanatory view showing a sound pressure characteristics of air intake sound.

Further, the driver can physically feel an acceleration sound which linearly changes with a rise in acceleration, during acceleration. Additionally, as shown in FIG. 20, also the air intake sound of the air intake system 74 in the frequency range obtained by multiplying the basic revolution frequency by (number of engine cylinders/2) can be suppressed as a whole as compared with a case where no resonator 12 is provided (See a curve B in FIG. 20), thereby achieving suppression of noise vehicle outside noise.

In the above-mentioned first to third embodiments, in case that the number of the engine cylinders of the applied engine is four or six, if the frequency range of the sound pressure released from the resonator is set at the above-mentioned based engine speed×(number of engine cylinders/2), and if a setting is made to obtain a sound pressure characteristics that changes generally linearly with an increase in engine speed when the sound pressure released from the resonator is added to the air intake sound at this frequency range, the driver can physically feel the air intake sound having a dynamic feeling.

Furthermore, in the above-mentioned first and second embodiments, the number of the resonators is not limited to two, in which a more specific tuning can be made by increasing the number of the resonators, so that it is possible to further improve the followability of air intake sound to the target line in the above-mentioned FIG. 3, FIG. 6, FIG. 8 and the like.

In the respective embodiments discussed above, the resonating body of the resonator is not limited to one made of rubber, in which the resonating body may be, for example, one made of resin, corn paper or the like if it is arranged to be vibrated by intake air pulsation.

In the above-mentioned first and third embodiments, as the installation position of the resonator to the intake system approaches the engine, the energy of the intake air pulsation acted on the resonating body of the resonator increases, thereby making it possible to relatively increase the sound pressure released from the resonator. In other word, even in case of resonators having the same size, one which is disposed nearer to the engine than the other can release a high sound pressure. This makes it possible to achieve compactification of the resonator and improve freedom in design.

Figure 21:
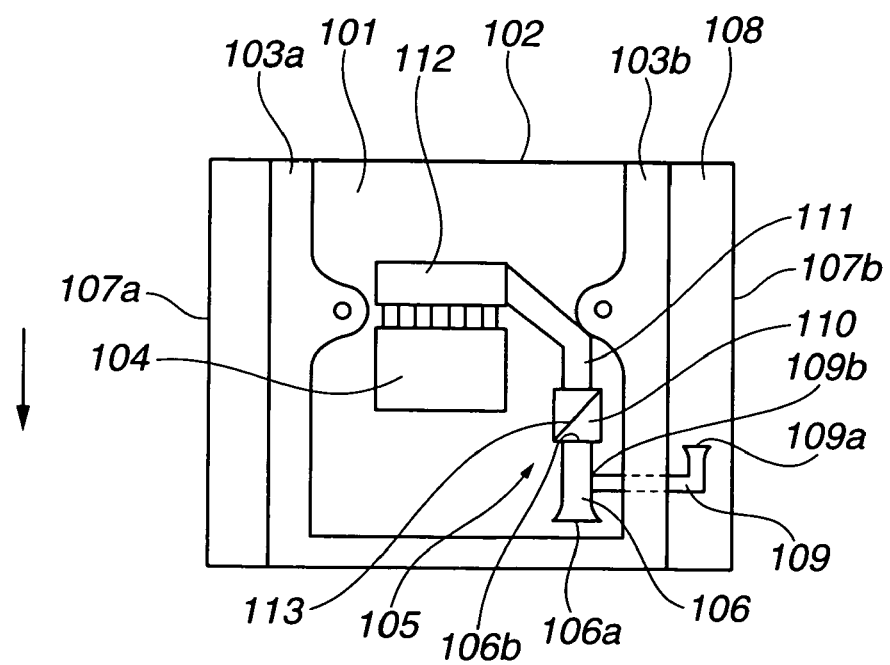
FIG. 21 is an explanatory view schematically showing a whole arrangement of the intake device of an internal combustion engine, according to a fourth embodiment of the present invention.

Next, a fourth embodiment of the present invention will be discussed. FIG. 21 is an explanatory view which schematically shows a state obtained by viewing from the upper side of the vehicle an engine compartment located at the front body of the vehicle in the fourth embodiment.

A in-line 4-cylinder engine 104 is disposed in an engine compartment defined by a dash panel 102, left and light side panels 103a, 103b and the like.

An intake device 105 for introducing intake air into an engine 104 generally includes a first outside air duct 106 opened at its one end 106a to a vehicle front face, a second outside air duct 109 which is opened at its one end 109a into a space 108 defined by a side panel 103b and a front fender 107b and directed to the side of a dash panel 102 so as to be connected at the other end 109b to the first outside air duct 106, an air cleaner 110 to which the other end 106b of the first outside air duct 106 is connected, a clean side duct 111 whose one end is connected to the clean side of the air cleaner 110, and an intake manifold 112 connected to the other end of the clean side duct 111.

The reference numeral 107a in FIG. 21 denotes a right-side front fender as viewed from the inside of a passenger compartment. The reference numeral 113 in FIG. 21 denotes a filter element disposed inside the air cleaner 110. The upstream side relative to this filter element 113 is a so-called dusty side, whereas the downstream side relative to the filter element is a so-called clean side. A throttle valve is disposed at a position at the upstream side of the intake manifold 112 and at the downstream side of the air cleaner 110, though not shown.

Figure 22:
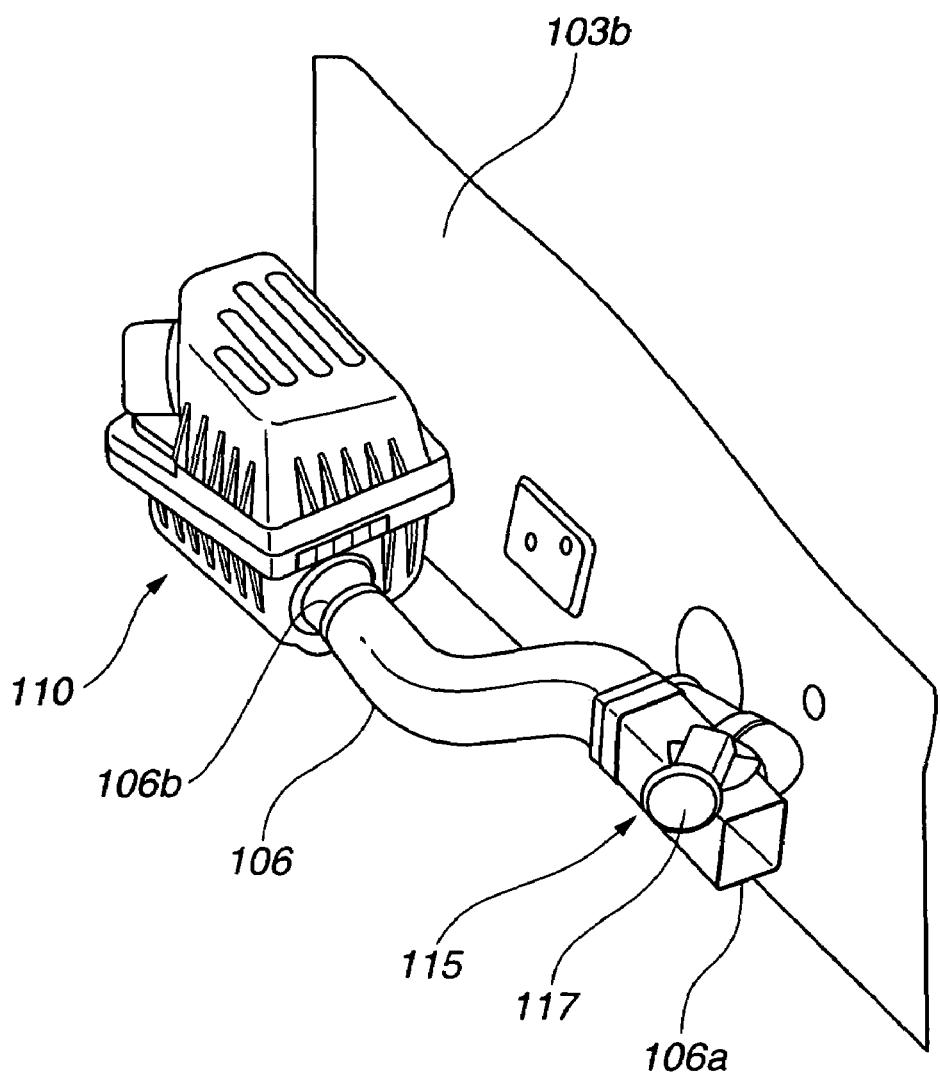
FIG. 22 is an explanatory view showing an essential part of the intake device of an internal combustion engine, according to a fourth embodiment of the present invention.
Figure 23:
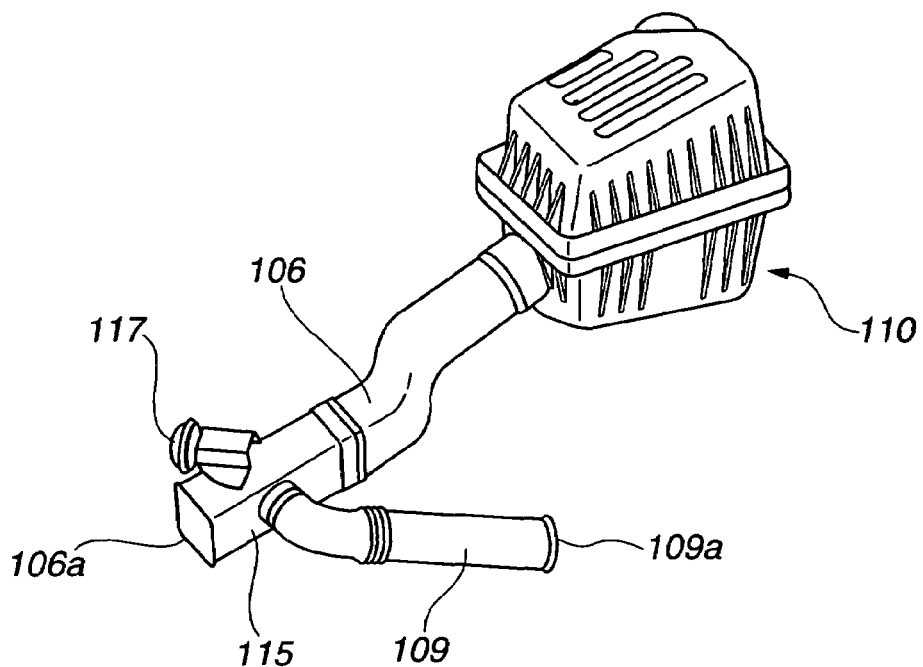
FIG. 23 is an explanatory view showing an essential part of the intake device of an internal combustion engine, according to a fourth embodiment of the present invention.
Figure 24:
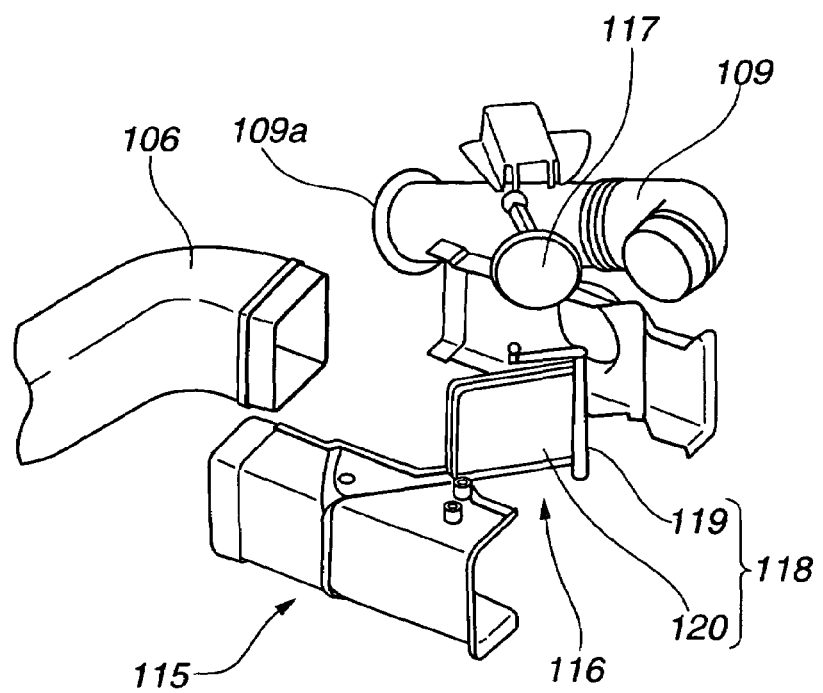
FIG. 24 is an explanatory view showing an essential part of the intake device of an internal combustion engine, according to a fourth embodiment of the present invention.

With reference to FIGS. 22 to 24, explanation will be made on the first outside air duct 106 and the second outside air duct 109 serving as an essential part of the intake device 105 in the fourth embodiment.

The first outside air duct 106 is formed generally rectangular in passage sectional shape, at a connecting section 115 on the side of the one end 106a to which the second outside air duct 109 is connected.

The passage sectional area of the first outside air duct 106 is set larger than the passage sectional area of the second outside air duct 109. Additionally, in the first outside air duct 106, the passage length between the one end 106a and the connection section 115 of the first outside air duct 106 is set short as compared with that of the second outside air duct 109.

The second outside air duct 109 branched off from the first outside air duct 106 is so set in axial length or duct length as to release from its one end 109a sound having a frequency component required for improving tone of air intake sound inside the passenger compartment, during medium and high engine speed operations of the engine.

A change-over valve 116 is so disposed at the connecting section 115 of the first outside air duct 106 as to close either one of the second outside air duct 109 and the upstream side section of the first outside air duct 106 relative to the connecting section 115 and open the other, in accordance with an engine operating condition.

In other words, the change-over valve 116 is so disposed at the connecting section 115 as to accomplish the followings: When the other end 109b of the second outside air duct 109 is closed, air taken in mainly through the one end 106a of the first outside air duct 106 can be introduced into the air cleaner 110. When the upstream side section of the fist outside air duct 106 relative to the connecting section 115 is closed, air taken in mainly through the one end 109a of the second outside air duct 109 can be introduced into the air cleaner 110. Therefore, the intake device 105 of this fourth embodiment is arranged to vary the amount of intake air to be introduced into the air cleaner 110 by controlling the change-over valve 116 in accordance with the engine operating condition.

This change-over valve 116 is operated by an actuator 117 and has a valve body 118 which is in the shape of a generally rectangular plate and formed to have the generally same size as the passage sectional area of the connecting section 115. A section other than a frame-like outer peripheral section 119 of the valve member 118, i.e., a central section of the valve member 118 is formed of a sound-transmissible material 120 made of an air-permeable polypropylene fiber sheet. The sound-transmissible material 120 is high in air flow resistance (fine in pore size) as compared with the filter element 113 or the like of the air cleaner 110 so that substantially only intake sound passes therethrough. The sound-transmissible material 120 may be a flame-tight sheet which is formed of polyester fiber or the like which has been subjected to flameproofing treatment, a foamable polyurethane sheet, or a non-woven sheet formed of polyester fiber or the like. The sound-transmissible material 120 is different from an excitative diaphragm formed of an elastomeric material such as rubber or the like and is not positively vibrated by intake air pulsation, and therefore it is not readily extensible or breakable so as to maintain its desired function throughout a long time.

Figure 25:
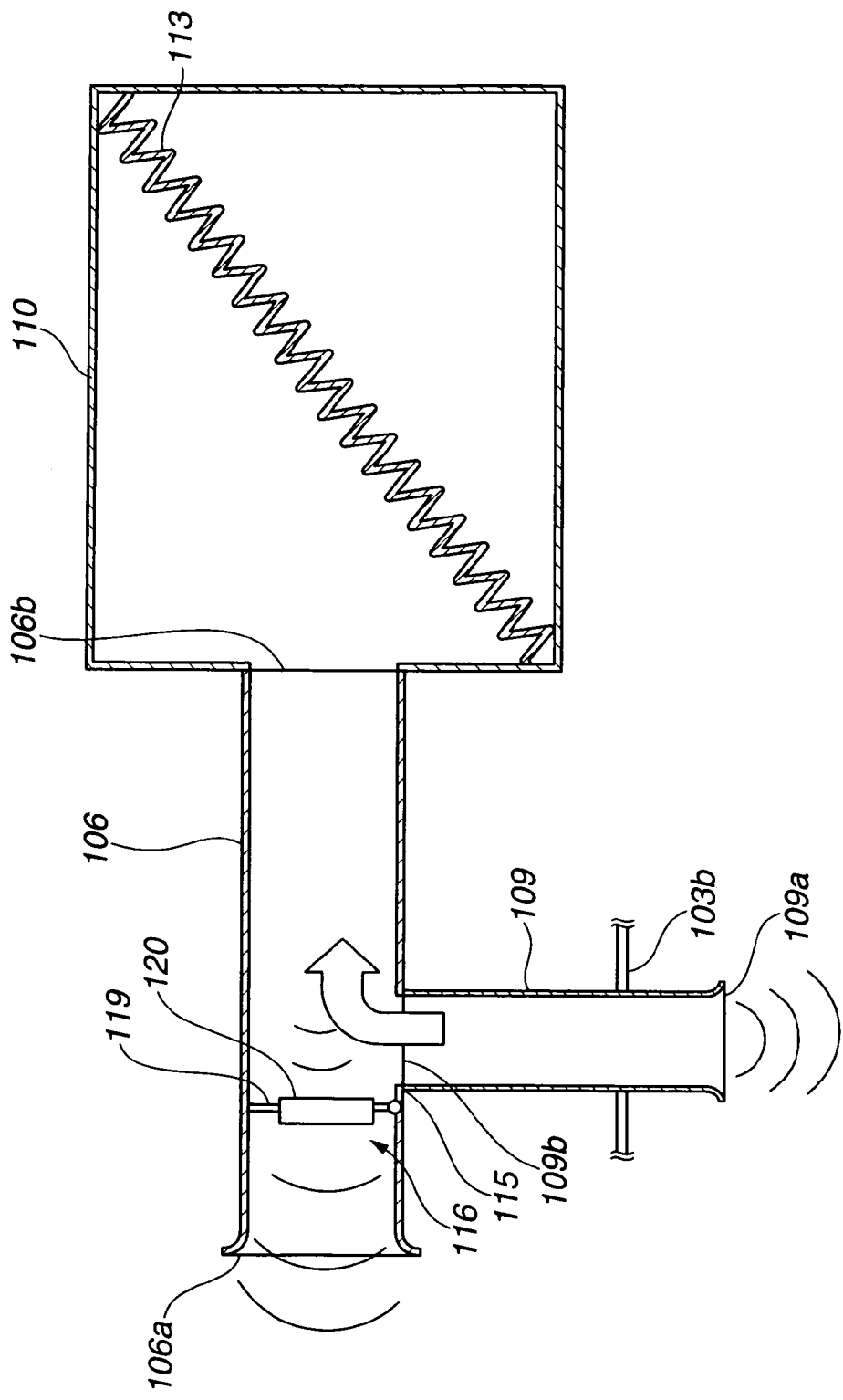
FIG. 25 is an explanatory view schematically showing an essential part of the intake device of an internal combustion engine, according to a fourth embodiment of the present invention.

In the intake device 105 in such a fourth embodiment, as shown in FIG. 25, during a low engine speed operation of the engine in which the engine speed is low so as to be low in intake air amount, the section at the upstream side of the first outside air duct 106 relative to the connecting section 115 is closed with the change-over valve 116, so that outside air taken in through the second outside air duct 109 is introduced into the air cleaner 110. That is, during the low engine speed operation of the engine, a path of from the one end 109a of the second outside air duct 109 to the air cleaner 110 serves as a constituting element of the intake air passage, in which the section at the upstream side of the connecting section 115 of the first outside air duct 106 corresponds to a resonance passage.

As a result, during the low engine speed operation of the engine, air is taken in the air cleaner 110 through the second outside air duct 109 having a relatively small passage sectional area, thereby reducing the air intake sound. Further, a part of the air intake sound is allowed to leak toward the side of the one end 106a of the first outside air duct 106 through the sound-transmissible material 120, thereby acting for noise reduction to obtain a silence characteristics without a tone addition while softening a local resonance which is generated in an intake air introduction path at the upstream side of the air cleaner 110 during the low engine speed operation of the engine and decided by the passage length of from the other end 106b of the first outside duct 106 to the connecting section 115 and the passage length of the second outside air duct 109.

Figure 26:
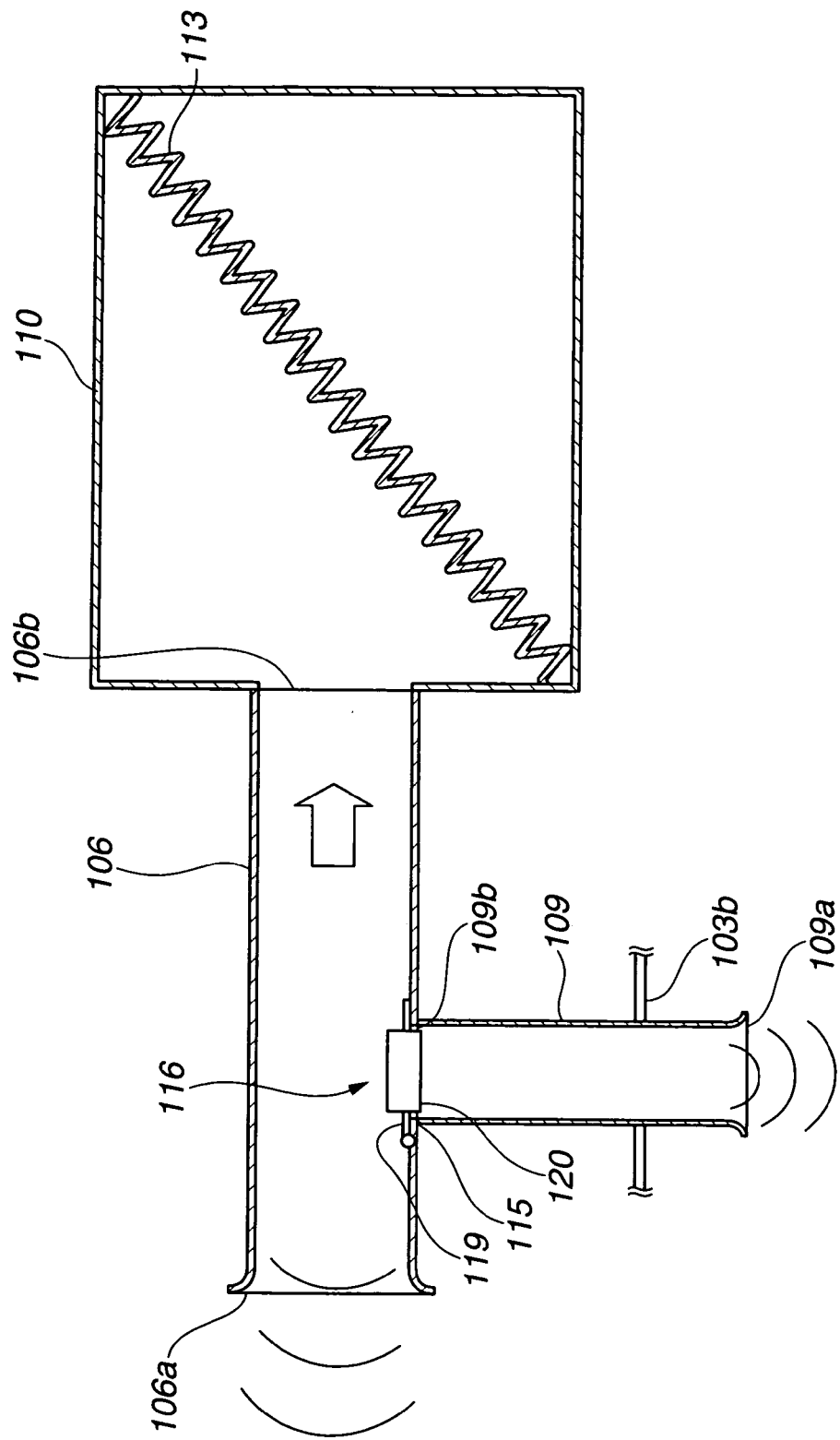
FIG. 26 is an explanatory view showing an essential part of the intake device of an internal combustion engine, according to a fourth embodiment of the present invention.

During the medium and high engine speed operations of the engine in which the engine speed becomes high so as to increase the intake air amount, as shown in FIG. 26, the other end 109b of the second outside air duct 109 is closed with the change-over valve 116, so that outside air taken in through the one end 106a of the first outside air duct 106 is introduced into the air cleaner 110. That is, during the medium and high engine speed operations of the engine, the first outside air duct 106 serves as a constituting element of the intake air passage, in which the second outside air duct 109 corresponds to a resonance passage.

As a result, during the medium and high engine speed operations of the engine, air is taken in the air cleaner through the first outside air duct 106 having a relatively large passage sectional area, thereby securing a power output performance of the engine 104. Further, a part of the air intake sound is introduced through the sound-transmissible material 120 to the inside of the second outside air duct 109, so that a so-called columnar resonance is generated within the second outside air duct 109 thereby making it possible that the second outside air duct 109 can release the sound pressure having a frequency component required for improving tone of the air intake sound. Additionally, the local resonance is softened for the first outside air duct 106 is softened, while the local resonance is induced for the second outside air duct 109.

Figure 27:
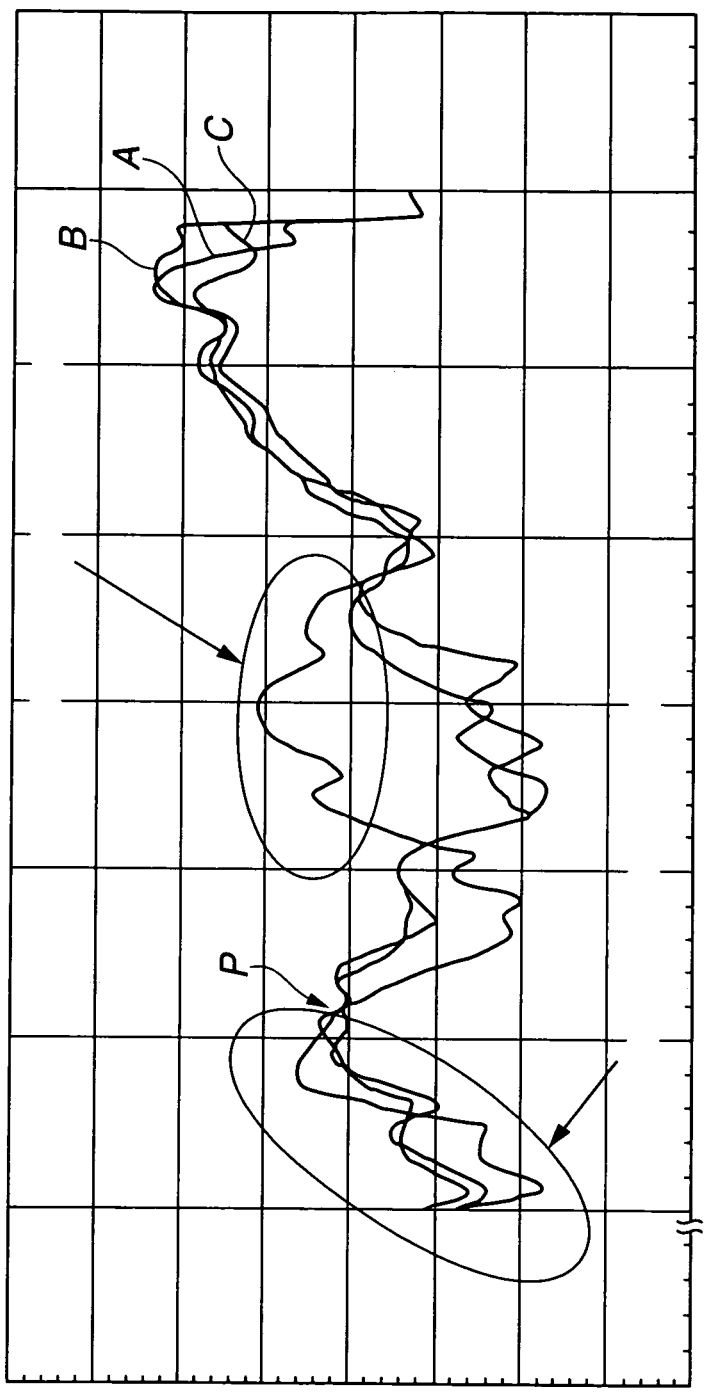
FIG. 27 is an explanatory view showing a sound pressure level within a passenger compartment.

As a result, as shown in FIG. 27, a sound pressure level within the passenger compartment can be lowered during the low engine speed operation of the engine, and a sound pressure having a frequency component required for improving tone of air intake sound within the passenger compartment is released from the second outside air duct 109 during the medium and high engine speed operations of the engine, thereby improving the tone of air intake sound. That is, it is made possible to realize both lowering the sound pressure of air intake sound and improving the tone of air intake sound.

Here, the timing of change-over action of the change-over valve 116 is set according to experimental adaptation and the like, and the change-over action is carried out at the timing of P in FIG. 27 in this embodiment.

In FIG. 27, a characteristics line A indicates a sound pressure level within the passenger compartment in a case that the engine speed is changed in a condition where a section at the upstream side of the connecting section 115 of the first outside air duct 106 is closed with the change-over valve 116; a characteristics line B indicates a sound pressure level within the passenger compartment in a case that the engine speed is changed in a condition where the other end 109b of the second outside air duct 109 is closed with the change-over valve 116; and a characteristics line C indicates a sound pressure level within the passenger compartment in a case that engine speed is changed, using a general intake device in which a passage through which air is sent to an air cleaner is not changed over in accordance with an engine operating condition.

Although the change-over action of the change-over valve 116 is accomplished in accordance with the engine speed in the above-mentioned fourth embodiment, the change-over action of the change-over valve 116 may be accomplished in accordance with a target intake air amount decided by an engine operating condition.

Next, a fifth embodiment of the present invention will be discussed. Although the intake device in this fifth embodiment is the same in layout (See FIG. 21) and generally the same in arrangement as those in the above-mentioned fourth embodiment, the arrangement at the connecting section between the first outside air duct 106 and the second outside air duct 109 is different from that in the fourth embodiment.

Figure 28:
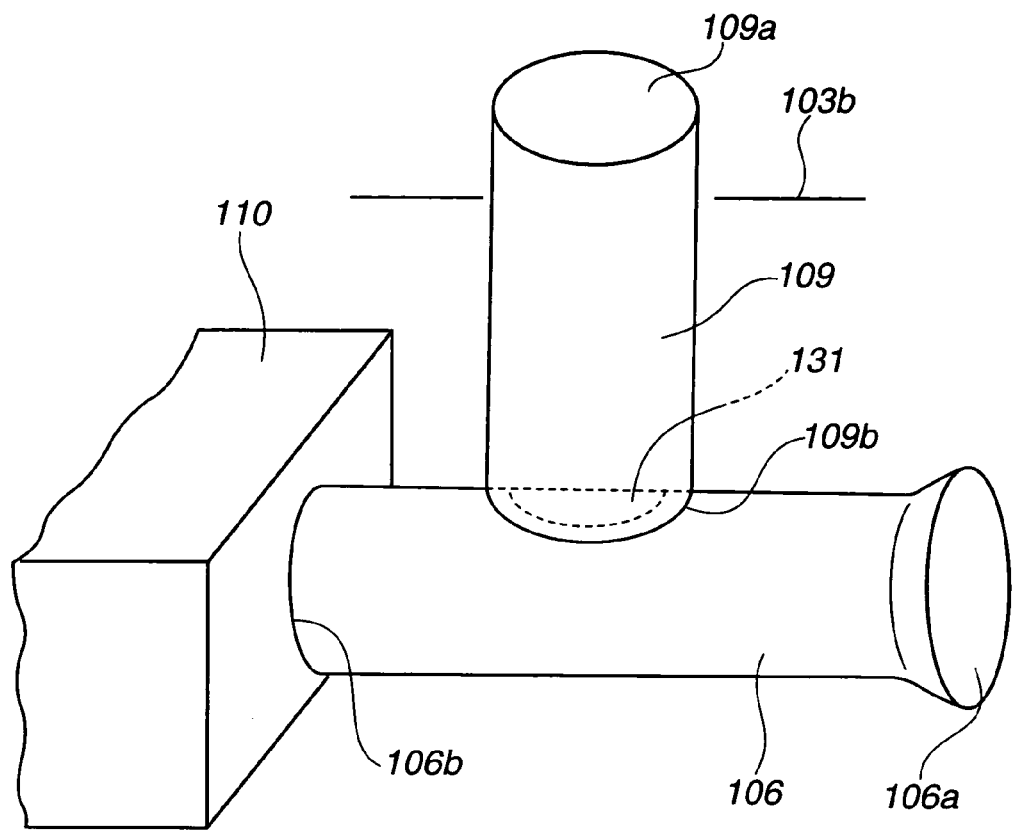
FIG. 28 is an explanatory view showing an essential part of the intake device of an internal combustion engine, according to a fifth embodiment of the present invention.

In other words, in this fifth embodiment, as shown in FIG. 28, a sound-transmissible material 131 is disposed in the second outside air duct 109 which is branched off from the first outside air duct 106. More specifically, the other end 109b of the second outside air duct 109 connected to the first outside air duct 106 is covered with the sound-transmissible material 131, so that air is flowable in the first outside air duct 106 through the sound-transmissible material 131. Additionally, an arrangement corresponding to the change-over valve 116 in the fourth embodiment is not disposed at the connecting section between the first outside air duct 106 and the second outside air duct 109. As a result, in this fifth embodiment, the first outside air duct 106 serves as a constituting element of the intake air passage, in which the second outside air duct 109 corresponds to a resonance passage.

Additionally, the duct length of the second outside air duct 109 in the fifth embodiment is set to be able to add a sound pressure having a certain frequency range to air intake sound.

In such a firth embodiment, a part of air intake sound is allowed to leak through the sound-transmissible material 131 to the second outside air duct 109 thereby making it possible to lower the sound pressure of air intake sound. Additionally, air intake sound introduced through the sound-transmissible material 131 is resonated within the second outside air duct 109 thereby making it possible to release the sound pressure having a frequency component required for improving the tone of air intake sound, from the one end 109a of the second outside air duct 109.

Figure 29:
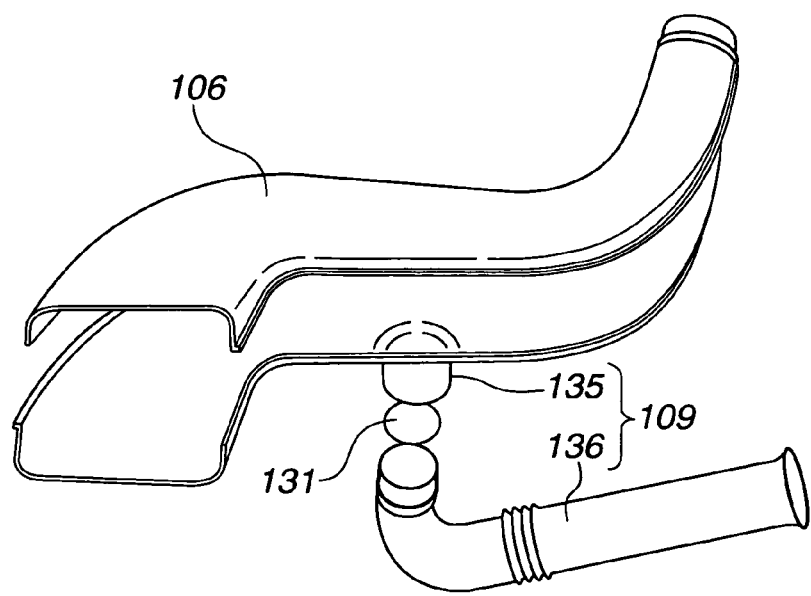
FIG. 29 is an explanatory view showing another embodiment of the intake device of an internal combustion engine, according to the present invention.

While an arrangement is made such that the other end 109b of the second outside air duct 109 connected to the first outside air duct 106 is covered with the sound-transmissible material 131 in this fifth embodiment, the disposing position of the sound-transmissible material 131 is not limited to the position of the other end 109b of the second outside air duct 109. In concrete, it is possible to dispose the sound-transmissible material 131 at the position of the side of the other end 109b relative to the one end 109a of the second outside air duct 109, i.e., at a part of passage of the second outside air duct 109 in order that sound leaking through the sound-transmissible material 131 resonates within the second outside air duct 109. For example, as shown in FIG. 29, it is possible to arrange such that the second outside air duct 109 is constituted by an other end side section 135 formed integral with the first outside air duct 106 and an one end side section 136 connected to this other end side section 135, in which the sound-transmissible material 131 is disposed at the connecting section between the other end side section 135 and the one end side section 136.

Next, a sixth embodiment of the present invention will be discussed. Although the intake device in this fifth embodiment is the same in layout (See FIG. 21) and generally the same in arrangement as those in the above-mentioned fourth embodiment, the arrangement at the connecting section between the first outside air duct 106 and the second outside air duct 109 is different from that in the fourth embodiment.

Figure 30:
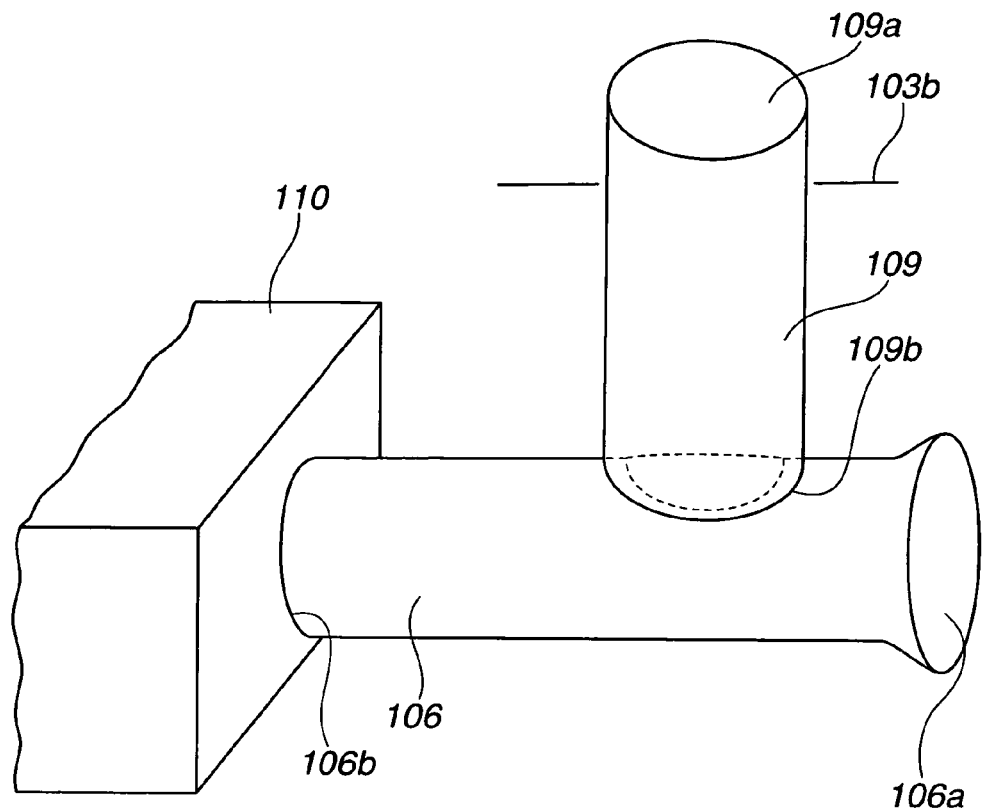
FIG. 30 is an explanatory view of an essential part of the intake device of an internal combustion engine, according to a sixth embodiment of the present invention.

That is, in this sixth embodiment, as shown in FIG. 30, the second outside air duct 109 is formed to be branched off from the first outside air duct 106. More specifically, the intake device in this sixth embodiment is an arrangement formed by removing the sound-transmissible material 131 disposed at the other end 109b of the second outside air duct 109 in the intake device of the above-mentioned fifth embodiment. As a result, also in this sixth embodiment, the first outside air duct 106 serves as a constituting element of intake air passage, in which the second outside air duct 109 corresponds to a resonance passage.

In this sixth embodiment, a part of air intake sound is allowed to leak from the first outside air duct 106 to the second outside air duct 109 thereby making it possible to lower the sound pressure of air intake sound. Additionally, air intake sound introduced in the second outside air duct 109 is resonated within the second outside air duct 109 thereby making it possible to release the sound pressure having a frequency component required for improving the tone of air intake sound, from the one end 109a of the second outside air duct 109. It is to be noted that the sound pressure lowering effect obtained by this sixth embodiment is small as compared with that in the fifth embodiment in which a part of air intake sound is allowed to leak through the sound-transmissible material 131 to the second outside air duct 109.

Figure 31:
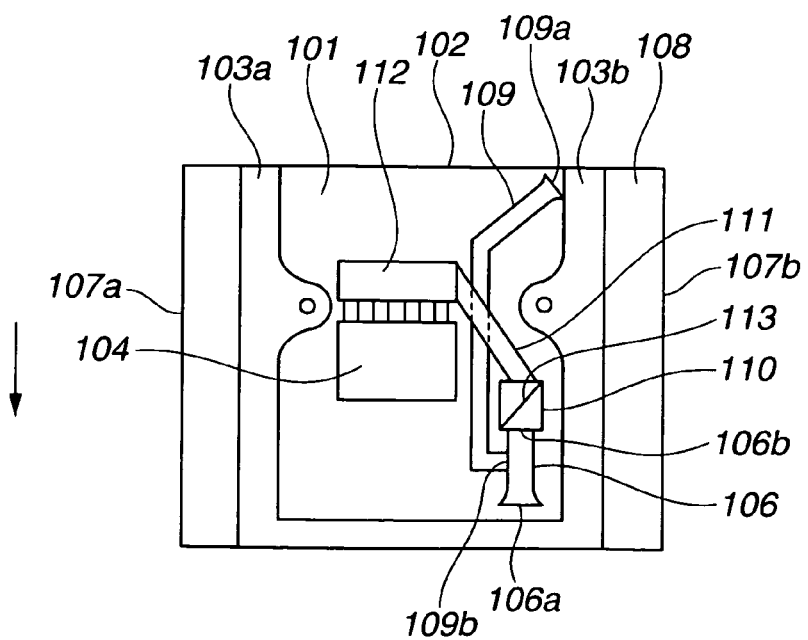
FIG. 31 is an explanatory view showing another embodiment of the intake device of an internal combustion engine, according to the present invention.
Figure 32:
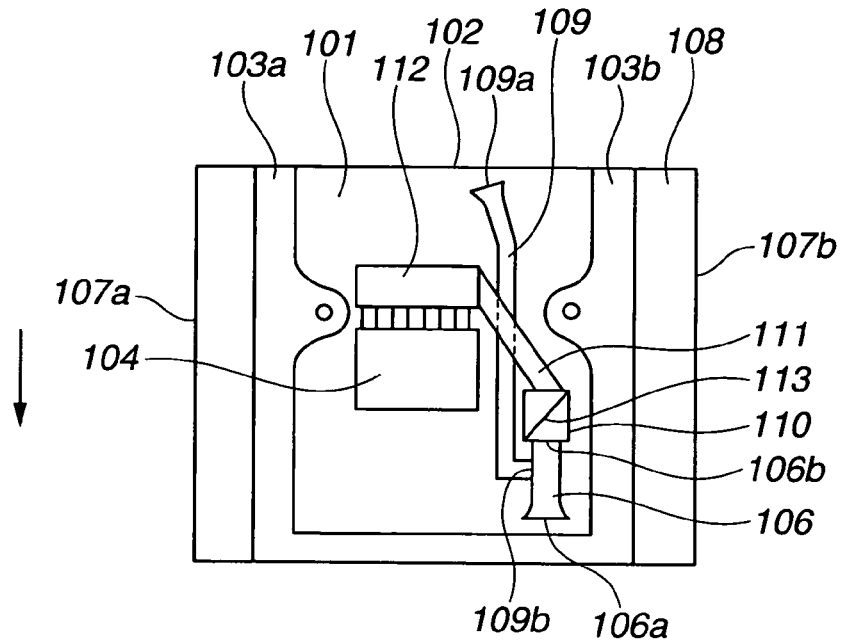
FIG. 32 is an explanatory view showing a further embodiment of the intake device of an internal combustion engine, according to the present invention.

Here, although a layout arrangement is taken in the above-mentioned fourth to sixth embodiments, such that the one end 109a of the second outside duct 109 is opened to the space 108 defined by the side panel 103b and the front fender 107b, the one end 109a of the second outside air duct 109 may be opened to be close to a corner section of the engine compartment 101 as shown in FIG. 31, or the one end 109a of the second outside air duct 109 is opened to be close to the dash panel 102 as shown in FIG. 32. In other words, it is possible that the one end 109a of the second outside air duct 109 is not directed to the engine 104 and located at a position where the frequency component required for improving the tone of air intake sound is readily released into the passenger compartment.

Figure 33:
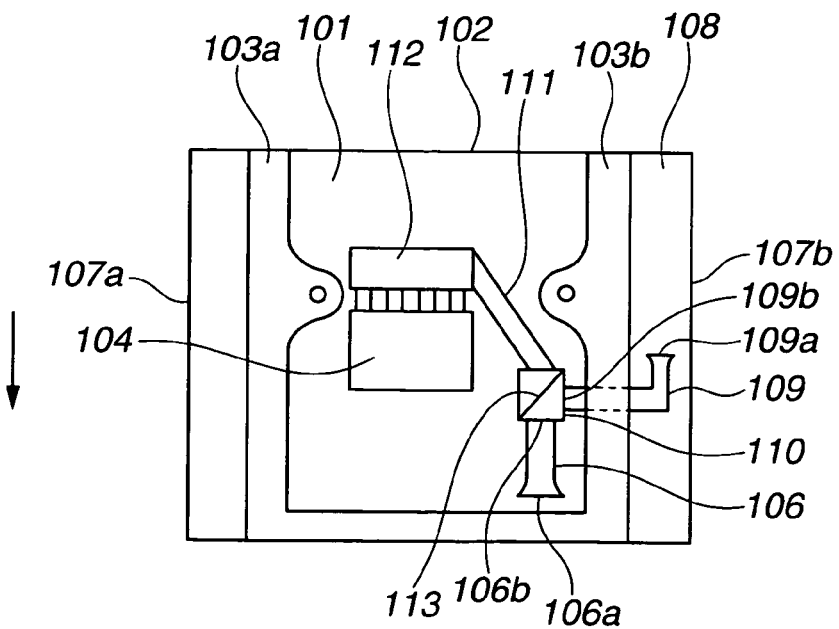
FIG. 33 is an explanatory view showing a further embodiment of the intake device of an internal combustion engine, according to the present invention.
Figure 34:
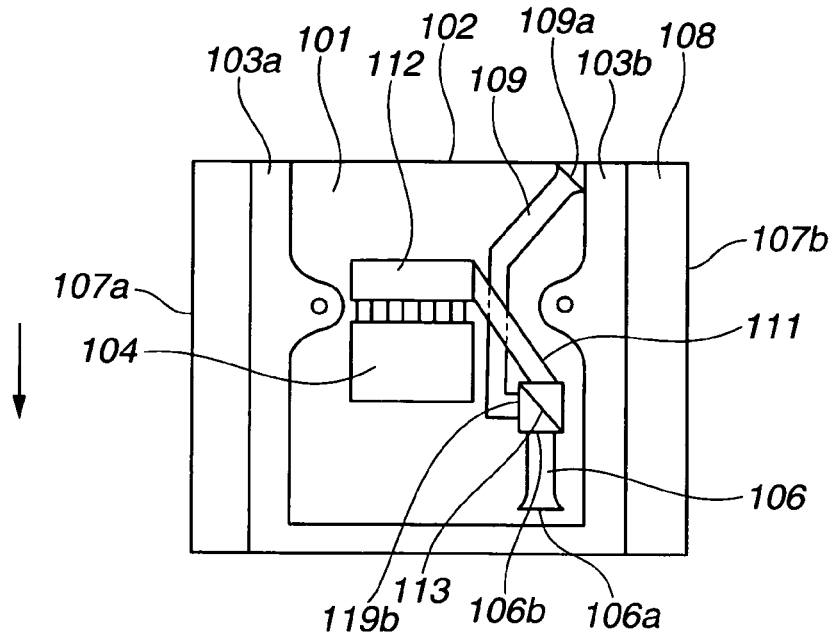
FIG. 34 is an explanatory view showing a further embodiment of the intake device of an internal combustion engine, according to the present invention.
Figure 35:
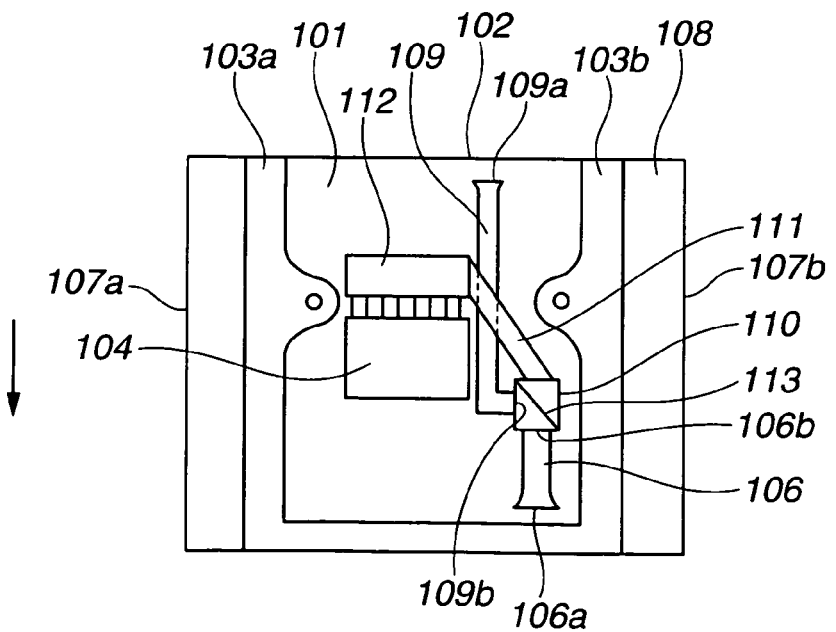
FIG. 35 is an explanatory view showing a further embodiment of the intake device of an internal combustion engine, according to the present invention.

Additionally, in the above-mentioned fifth and sixth embodiments, it is unnecessary that the second outside air duct 109 is branched off from the first outside air duct 106, and it is possible to form such an arrangement that the second outside air duct 109 is communicated with the dusty side of the air cleaner 110 as shown in FIG. 33 to FIG. 35.

Figure 36:
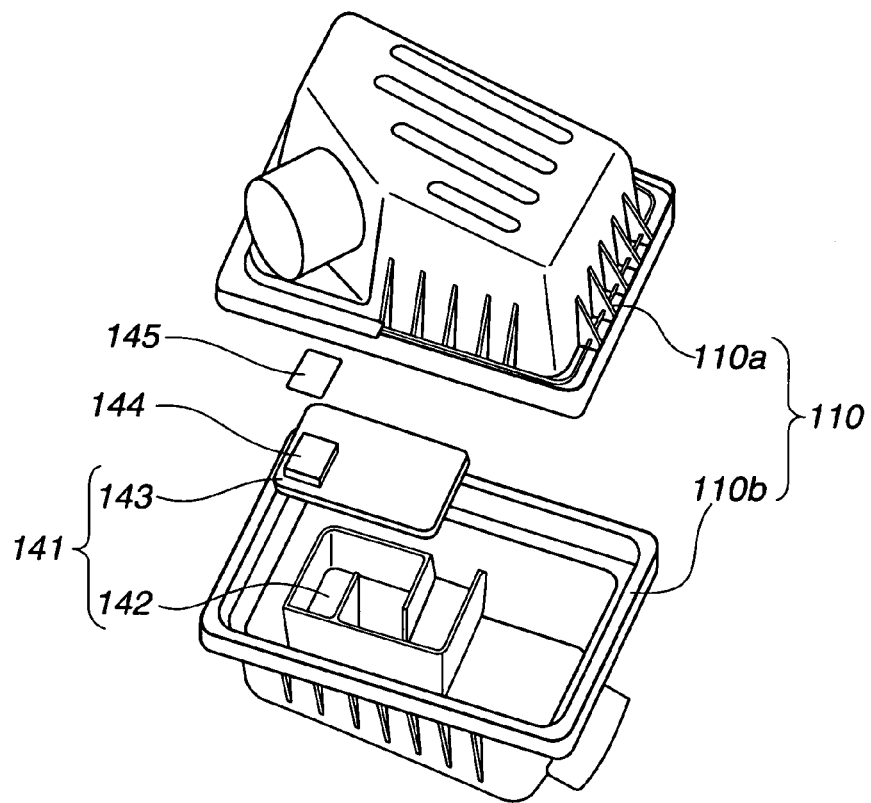
FIG. 36 is an explanatory view showing an essential part of the intake device of an internal combustion engine, according to a seventh embodiment of the present invention.
Figure 37:
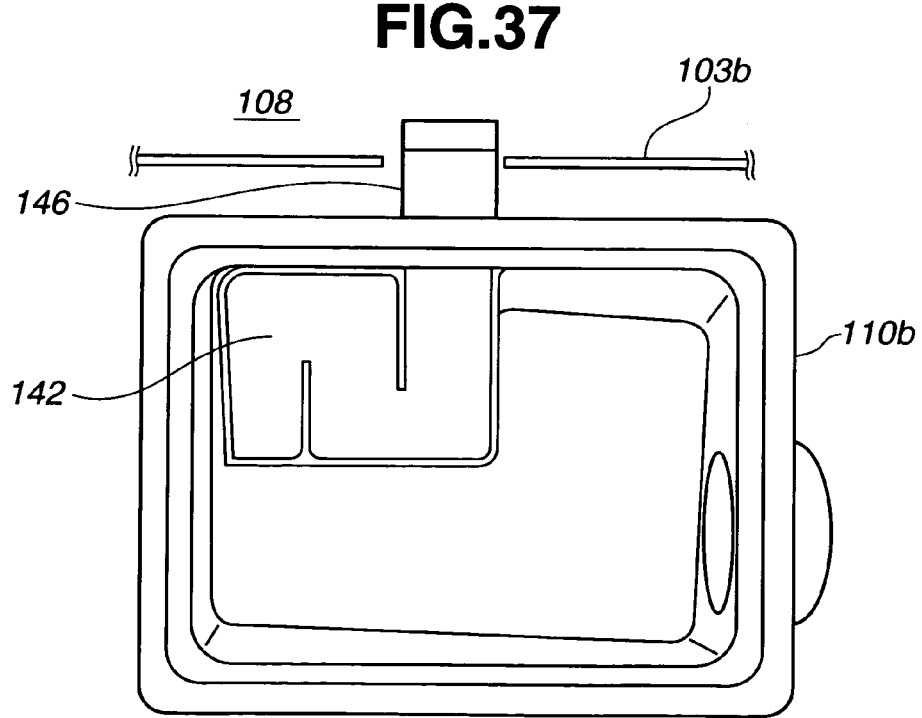
FIG. 37 is an explanatory view showing an essential part of the intake device of an internal combustion engine, according to the seventh embodiment of the present invention.

Next, a seventh embodiment of the present invention will be discussed. Although the intake device in the seventh embodiment is the generally same in layout as that in the above-mentioned fifth embodiment, it does not take an arrangement in which the second outside air duct 106 serving as a resonance passage is branched off from the first outside air duct 106, and takes an arrangement to be housed in the air cleaner 110 as shown in FIGS. 36 and 37.

The air cleaner adjacent to the side panel 103b is generally constituted of an air cleaner upper section 110a to which a clean side duct 111 is connected, an air cleaner lower section 110b to which the first outside air duct 106 is connected, and a filter element 113 (not shown in FIGS. 36 and 37) held between the air cleaner upper section 110a and the air cleaner lower section 110b, in which the downstream side of the air cleaner lower section 110b mainly serves as the clean side. A second outside air duct main body section 142 constituting the second outside air duct 141 is located inside and formed integral with the air cleaner lower section 110b. This second outside air duct main body section 142 is generally in the shape of a box whose upper surface on the side of the air cleaner upper section 110a is wholly opened, and the interior of the second outside air duct main body section 142 is partitioned in a so-called labyrinth shape.

By assembling a generally plate-shaped second outside air duct lid section 143 separate from the second outside air duct main body section 142 on the upper surface of the second outside air duct main body section 142, a structure is formed such that a passage is defined in the second outside air duct main body section 142 so that the second outside air duct 141 is formed inside the air cleaner 110. The second outside air duct lid section 143 is formed with a through-hole 144. This through-hole 144 is covered with a sound-transmissible material 145.

A second outside air duct projecting section 146 is formed projecting from one side surface of the air cleaner lower section 110b so as to form part of the second outside air duct 141 upon being communicated with the above-mentioned passage defined in the second outside air duct main body section 142. The tip end of this second outside air duct projecting section 146 extends to the inside of the space 108 defined by the side panel 103b and the front fender 103b and is opened to this space 108.

Here, the duct length of the second outside air duct 141 in this seventh embodiment is so set as to add a sound pressure in a certain frequency range to air intake sound.

In such a seventh embodiment, in addition to obtaining the same operation effects as those in the above-mentioned fifth embodiment, freedom in layout of the intake device can be improved because the second outside air duct 141 is housed in the air cleaner 110.

While an arrangement is formed such that the through-hole formed in the second outside air duct lid section 143 is covered with the sound-transmissible material 145 in this seventh embodiment, the disposing position of the sound-transmissible material 145 is not limited to the through-hole 144 of the second outside air duct lid section 143. In concrete, the sound-transmissible material 145 may be disposed inside the second outside air duct main body section 142 in order that sound leaking from the sound-transmissible material 145 resonates inside the second outside air duct 141. Additionally, although the through-hole 144 of the second outside air duct lid section 143 is covered with the sound-transmissible material 145 in this seventh embodiment, it is possible that the sound-transmissible material 145 is not disposed to the second outside air duct 141.

The invention claimed is:

1. An intake device of an internal combustion engine, comprising:

a clean side duct connected to a clean side of an air cleaner; and a resonator including a resonating body which is vibrated by intake air pulsation in an intake system, a volume chamber directly installed to the clean side duct and connected through the resonating body to the intake system, and a volume chamber opening section through which an interior space of the volume chamber is communicated with an outside to the resonator, wherein the interior space of the volume chamber and an interior of the intake system are partitioned by the resonating body, wherein the resonator is so set that a sound pressure in a certain frequency range is released from the volume chamber opening section to the outside under vibration of the resonating body.

2. An intake device of an internal combustion engine as claimed in claim 1, wherein a setting is made such that sound pressure of air intake sound increases with an increase in engine speed by adding sound pressure released from the resonator to the air intake sound.

3. An intake device of an internal combustion engine as claimed in claim 2, wherein the volume chamber opening section is close to at least one of a dash panel or either one of right and left side panel of panels defining an engine compartment.

4. An intake device of an internal combustion engine as claimed in claim 3, wherein the intake device comprises a plurality of the resonators which are set to release respectively sound pressures in frequency ranges similar to each other through respective volume chamber opening sections to the outside, the plurality of resonators being installed to the intake system in such a manner that the sound pressures to be released from the respective resonators are released to the outside with a certain time difference between the sound pressures.

5. An intake device of an internal combustion engine as claimed in claim 4, wherein the resonating body is set such that the sound pressure in a frequency range of (engine speed/60)×(natural number/2) is released from the volume chamber opening section in a certain engine speed range of the engine.

6. An intake device of an internal combustion engine, comprising:

an intake air passage through which intake air is introduced into the internal combustion engine, and a resonance passage branched off from the intake air passage, wherein the resonance passage has one end opened to atmospheric air and the other end connected to the intake air passage to always allow intake sound to be transmitted from the intake air passage to the resonance passage, the resonance passage having a passage length set to add a sound pressure in a certain frequency range to air intake sound.

7. An intake device of an internal combustion engine as claimed in claim 6, wherein a sound-transmissible material having a gas permeability is disposed in the resonance passage.

8. An intake device of an internal combustion engine as claimed in claim 6, wherein:

an air cleaner is disposed in the intake air passage, the resonance passage being communicated with the intake air passage at an upstream side of the air cleaner, wherein a change-over valve is disposed in the intake air passage at a connecting section to which the resonance passage is connected, the change-over valve being adapted to close either one of the resonance passage and an upstream side section of the intake air passage relative to the connecting section and open the other in accordance with an engine operating condition, wherein at least a part of the change-over valve is formed of a sound-transmissible material having a gas permeability.

9. An intake device of an internal combustion engine, comprising:

a clean side duct connected to a clean side of an air cleaner, the clean side duct having a wall having a through-hole; and a resonator including:

a volume chamber directly installed to the clean side duct, the volume chamber including a wall section defining an interior space, the wall section being directly disposed on the wall of the clean side duct, and a resonating body which is vibrated by intake air pulsation in an intake system, the resonating body being disposed to block the through-hole of the clean side duct wall, wherein the volume chamber is connected through the resonating body to the intake system, a volume chamber opening section through which the interior space of the volume chamber is communicated with an outside to the resonator, wherein the interior space of the volume chamber and interior of the intake system are partitioned by the resonating body, wherein the resonator is so set that a sound pressure in a certain frequency range is released from the volume chamber opening section to the outside under vibration of the resonating body.

* * * * *